(12) United States Patent
Kovacs et al.

(10) Patent No.: US 11,316,191 B2
(45) Date of Patent: Apr. 26, 2022

(54) ELECTROCHEMICAL SECONDARY CELLS FOR HIGH-ENERGY OR HIGH-POWER BATTERY USE

(71) Applicant: Broadbit Batteries Oy, Espoo (FI)

(72) Inventors: Andras Kovacs, Espoo (FI); Tapani Alasaarela, Helsinki (FI); David Brown, Helsinki (FI); Débora Ruiz-Martinez, Alicante (ES); José Manuel Orts-Mateo, Alicante (ES); Roberto Gomez-Torregrosa, Alicante (ES)

(73) Assignee: Broadbit Batteries Oy, Espoo (FI)

( * ) Notice: Subject to any disclaimer, the term of this patent is extended or adjusted under 35 U.S.C. 154(b) by 1 day.

(21) Appl. No.: 15/764,860

(22) PCT Filed: Mar. 4, 2016

(86) PCT No.: PCT/FI2016/050133
§ 371 (c)(1),
(2) Date: Mar. 29, 2018

(87) PCT Pub. No.: WO2017/055678
PCT Pub. Date: Apr. 6, 2017

(65) Prior Publication Data
US 2018/0331387 A1 Nov. 15, 2018

(30) Foreign Application Priority Data

Sep. 30, 2015 (FI) ...................................... 20150270

(51) Int. Cl.
*H01M 10/054* (2010.01)
*H01M 4/134* (2010.01)
(Continued)

(52) U.S. Cl.
CPC .......... *H01M 10/054* (2013.01); *H01G 11/30* (2013.01); *H01G 11/32* (2013.01);
(Continued)

(58) Field of Classification Search
CPC ............. H01M 4/0445; H01M 4/0438; H01M 4/0447; H01M 4/133; H01M 4/134;
(Continued)

(56) References Cited

U.S. PATENT DOCUMENTS 3,953,234 A * 4/1976 Hoffmann ................. C25C 1/02
429/199
4,139,680 A * 2/1979 Schlaikjer ................. C01B 6/00
429/50
(Continued)

FOREIGN PATENT DOCUMENTS

DE 102012203019 A1 8/2013
EP 2860799 A1 4/2015
(Continued)

OTHER PUBLICATIONS

Goncalves et al.; New Potential Candidates for Redox Battery Using Liquid Ammoniates: Na+/Na and Ag+/Ag; Portugaliae Electrochimica Acta 24 (2006) 117-127.
(Continued)

*Primary Examiner* — Gregg Cantelmo
(74) *Attorney, Agent, or Firm* — Chernoff, Vilhauer, McClung & Stenzel, LLP

(57) ABSTRACT

An electrochemical cell for a secondary battery, preferably for use in an electric vehicle, is provided. The cell includes a solid metallic anode, which is deposited over a suitable current collector substrate during the cell charging process. Several variations of compatible electrolyte are disclosed, along with suitable cathode materials for building the complete cell.

37 Claims, 13 Drawing Sheets

(51) Int. Cl.

| | | |
|---|---|---|
| *H01M 4/38* | (2006.01) | |
| *H01M 4/587* | (2010.01) | |
| *H01M 4/62* | (2006.01) | |
| *H01M 10/0568* | (2010.01) | |
| *H01M 10/0569* | (2010.01) | |
| *H01M 10/0567* | (2010.01) | |
| *H01M 4/1395* | (2010.01) | |
| *H01G 11/50* | (2013.01) | |
| *H01G 11/32* | (2013.01) | |
| *H01M 50/411* | (2021.01) | |
| *H01G 11/30* | (2013.01) | |
| *H01G 11/48* | (2013.01) | |
| *H01G 11/60* | (2013.01) | |
| *H01G 11/62* | (2013.01) | |
| *H01G 11/74* | (2013.01) | |
| *H01G 11/86* | (2013.01) | |
| *H01M 4/133* | (2010.01) | |
| *H01M 4/136* | (2010.01) | |
| *H01M 4/137* | (2010.01) | |
| *H01M 4/36* | (2006.01) | |
| *H01M 4/58* | (2010.01) | |
| *H01M 4/60* | (2006.01) | |
| *H01M 10/0563* | (2010.01) | |
| *H01M 10/058* | (2010.01) | |
| *H01M 10/44* | (2006.01) | |
| *H01M 4/02* | (2006.01) | |
| *B60L 58/10* | (2019.01) | |
| *B60K 6/28* | (2007.10) | |
| *H01G 11/52* | (2013.01) | |

(52) U.S. Cl.
CPC .............. *H01G 11/48* (2013.01); *H01G 11/50* (2013.01); *H01G 11/60* (2013.01); *H01G 11/62* (2013.01); *H01G 11/74* (2013.01); *H01G 11/86* (2013.01); *H01M 4/133* (2013.01); *H01M 4/134* (2013.01); *H01M 4/136* (2013.01); *H01M 4/137* (2013.01); *H01M 4/1395* (2013.01); *H01M 4/364* (2013.01); *H01M 4/381* (2013.01); *H01M 4/582* (2013.01); *H01M 4/587* (2013.01); *H01M 4/5825* (2013.01); *H01M 4/606* (2013.01); *H01M 4/622* (2013.01); *H01M 4/624* (2013.01); *H01M 10/058* (2013.01); *H01M 10/0563* (2013.01); *H01M 10/0567* (2013.01); *H01M 10/0568* (2013.01); *H01M 10/0569* (2013.01); *H01M 10/44* (2013.01); *H01M 50/411* (2021.01); *B60K 6/28* (2013.01); *B60L 58/10* (2019.02); *B60Y 2200/91* (2013.01); *B60Y 2200/92* (2013.01); *B60Y 2400/112* (2013.01); *B60Y 2400/114* (2013.01); *H01G 11/52* (2013.01); *H01M 2004/027* (2013.01); *H01M 2004/028* (2013.01); *H01M 2220/20* (2013.01); *H01M 2300/002* (2013.01); *H01M 2300/0025* (2013.01); *H01M 2300/0028* (2013.01); *Y02E 60/13* (2013.01)

(58) Field of Classification Search
CPC ...... H01M 4/136; H01M 4/364; H01M 4/381; H01M 4/582; H01M 4/5825; H01M 4/587; H01M 4/624; H01M 10/054; H01M 10/0563; H01M 10/0567; H01M 10/0568; H01M 10/0569; H01M 10/058; H01M 10/44; H01G 11/30; H01G 11/32; H01G 11/48; H01G 11/50; H01G 11/52; H01G 11/58; H01G 11/60; H01G 11/62; H01G 11/74; H01G 11/86

See application file for complete search history.

(56) References Cited

U.S. PATENT DOCUMENTS

| | | | |
|---|---|---|---|
| 4,891,281 A * | 1/1990 | Kuo | .................. H01M 6/14 |
| | | | 429/105 |
| 7,070,632 B1 | 7/2006 | Visco et al. | |
| 2005/0106467 A1* | 5/2005 | Hambitzer | .......... H01M 4/0438 |
| | | | 429/235 |
| 2011/0104526 A1 | 5/2011 | Boxley et al. | |
| 2011/0287305 A1* | 11/2011 | Scordilis-Kelley | .................. |
| | | | H01M 2/1653 |
| | | | 429/163 |
| 2012/0088133 A1* | 4/2012 | Lemmon | .......... H01M 10/3909 |
| | | | 429/87 |
| 2012/0171574 A1* | 7/2012 | Zhamu | .................. H01M 4/13 |
| | | | 429/300 |
| 2012/0308876 A1* | 12/2012 | Hambitzer | ............. H01M 4/808 |
| | | | 429/163 |
| 2014/0065465 A1 | 3/2014 | Johnson et al. | |
| 2014/0220428 A1 | 8/2014 | Zinck et al. | |
| 2015/0099195 A1* | 4/2015 | Kim | ..................... H01M 4/381 |
| | | | 429/346 |
| 2016/0072151 A1* | 3/2016 | Zhang | .............. H01M 10/0568 |
| | | | 429/331 |

FOREIGN PATENT DOCUMENTS

| | | |
|---|---|---|
| JP | 2012252962 A | 12/2012 |
| JP | 2013168343 A | 8/2013 |
| JP | 2014220203 A | 11/2014 |
| JP | 2015072808 A | 4/2015 |
| JP | 2015076400 A | 4/2015 |
| JP | 2015167129 A | 9/2015 |
| RU | 2560717 C2 | 8/2015 |
| WO | 9943034 A1 | 8/1999 |
| WO | 2015072577 A1 | 5/2015 |

OTHER PUBLICATIONS

Deng et al.; A low cost, all-organic Na-ion Battery Based on Polymeric Cathode and Anode; Scientific Reports 3,2671; DOI:10.1038/srep02671; www.nature.com/scientificreports; Sep. 16, 2013; 6 pages.

Bauer et al.; Shuttle suppression in room temperature sodium-sulfur batteries using ion selective polymer membranes; The Royal Society of Chemistry; Feb. 3, 2014; 50, 3208; 3 pages.

Hossain et al.; Rechargeable Lithium-Inorganic Electrolyte Cell; LABCOM Contract DAAL01-89-C-0939, Second Quarterly Report, Dec. 1, 1989 to Feb. 28, 1990; 13 pages; Waltham, Massachusetts.

Jeong et al.; A room-temperature sodium rechargeable battery using an SO2-based nonflammable inorganic liquid catholyte; Scientific Reports 5, 12827; DOI:10.1038/srep12827; www.nature.com/scientificreports; Aug. 5, 2015; 9 pages.

McKee et al.; Sulfuryl Chloride II Principles of Manufacture from Sulfur Burner Gas; Industrial and Engineering Chemistry; Apr. 1924; 1 page.

Kirk-Othmer Encyclopedia of Chemical Technology.

Broadbit Batteries Oy, Office Action, 2018114702/07(022987), dated Aug. 30, 2019, Russia.

Young et al., English Translation of Abstract, KR20130091146, Republic of Korea.

Belousenko et al., English Translation of Abstract, RU2092936C1, Russia.

Jun rt al., English Translation of Abstract, JP2010049903A, Japan.

Broadbit Batteries Oy, Search Report, 2018114702/07(022987), Russia.

Decision to Grant a Patent for an Invention Re: Russian Application No. 2018114702/07 dated Mar. 18, 2020.

(56) References Cited

OTHER PUBLICATIONS

English Translation of Notice of Reasons for Refusal Re: Japanese Patent Application No. 2018-536345 dated Nov. 24, 2020.
Shin-ichi Komaba et al., Electrochemistry, The Electrochemical Society of Japan, Feb. 5, 2012, pp. 93-97.

* cited by examiner

Figure 11
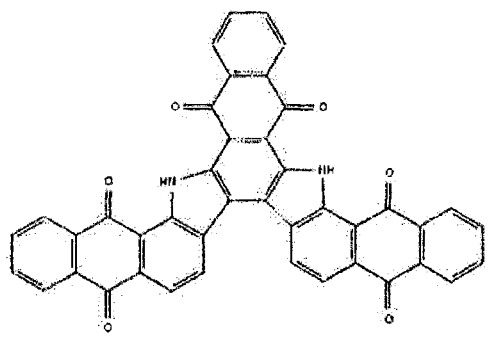
Vat brown 1
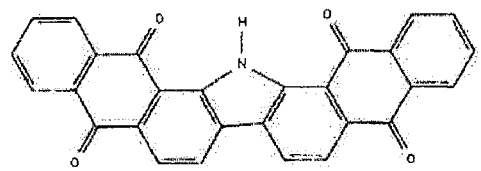
Vat yellow 28
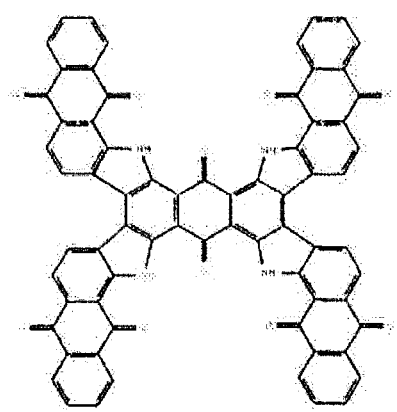
Vat green 8
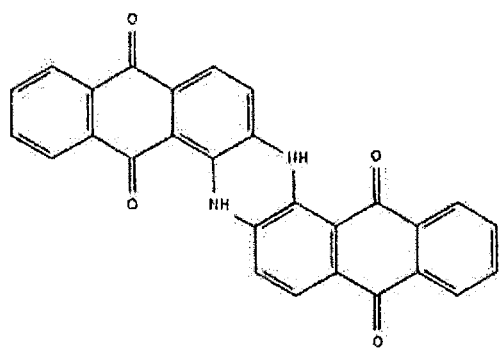
Vat blue 4
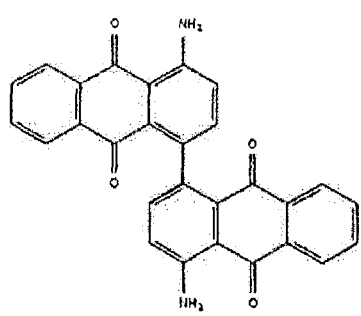
Pigment red 177
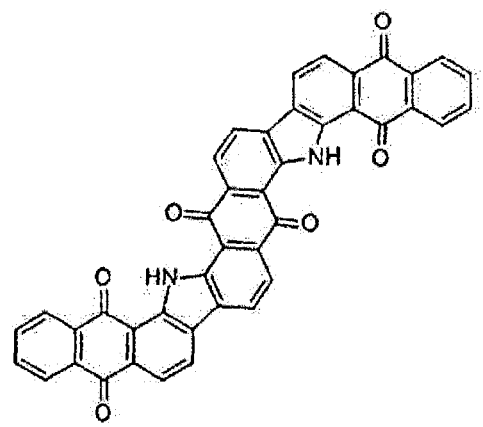
Vat orange 11

ELECTROCHEMICAL SECONDARY CELLS FOR HIGH-ENERGY OR HIGH-POWER BATTERY USE

CROSS-REFERENCE TO RELATED APPLICATIONS

This is a national stage application filed under 35 USC § 371 based on International Application No. PCT/FI2016/050133, filed Mar. 4, 2016, and claims priority under 35 USC § 119 of Finnish Patent Application No. 20150270 filed Sep. 20, 2015.

FIELD OF THE INVENTION

Generally the invention relates to rechargeable electrochemical cells, batteries and supercapacitors. In particular, the present invention concerns the aforesaid cells utilizing metallic sodium anodes, novel cathodes supporting high energy density, and solutions for electrolytes compatible with both of these particular electrodes.

BACKGROUND

Different implementations and concepts of batteries for Electric Vehicle (EV) are known to exist varying from batteries based on most widely utilized Li-ion automotive technology to others, such as lead-add, nickel-cadmium (Ni—Cd), nickel metal hydride (Ni-MH) and molten salt. Present day production of batteries for electric vehicles and hybrids is principally based on Li-ion battery technology. Said technology, however, has some shortcomings. Specifically, the high production cost of Li-ion batteries forces vehicle manufacturers to design range-restricted vehicles. Furthermore, uncertain lifespan and limited fast-charging capability of current Li-ion batteries adds hesitation to customers when choosing between a battery-powered fully electric or plug-in hybrid vehicle and a combustion engine vehicle. Moreover, the high present maturity of Li-ion technology implies that a significant improvement of battery performance and cost-efficiency would necessitate a drastically different conceptual approach.

Intensive research is being conducted in the field of battery technology to find a cost-effective combination of sufficient specific energy, capacity and durability. Numerous compounds have been explored as potential components for battery cells. Magnesium-based metallic anodes have been intensively researched, motivated by the possibly high specific energies of EV cells comprising magnesium-based metallic anodes. However, no ambient-temperature commercial device has been introduced yet because of the technical challenges associated with the lack of suitable cathode materials and/or problems with electrolyte systems capable of reversible metal deposition. According to a general consensus of battery researchers, the challenges associated with sodium-based metallic anodes are even greater than the problems of cells comprising magnesium-based metallic anodes. Consequently researchers working with metallic anodes have been mainly focused on magnesium-based electrode systems, despite the $Mg^{2+}/Mg$ potential being about 0.4 V higher than the $Na^+/Na$ potential, while sodium-based cells have been explored through intercalating Na-ion cell formulations. The metallic sodium anode based battery and supercapacitor cell inventions disclosed herein are therefore of high industrial importance and open up a new approach to the building of cost-effective yet high-performance batteries and supercapacitors.

SUMMARY OF THE INVENTION

An objective of the present invention is to disclose high-performance electrochemical cells for secondary high-energy or high-power batteries, based on anodes comprising metallic sodium. In a preferred embodiment, the cell is provided with a solid metallic anode which is electrodeposited during the first charging cycle, a cathode selected from the electrode structures disclosed in this invention, and an electrolyte selected from the electrolytes disclosed in this invention.

One aspect of the invention relates to disclosing electrolytes that support the essentially stable cycling of a metallic sodium anode. Another aspect relates to disclosing a current collector material supporting an essentially smooth, dendrite-free, and well-adhering electrochemical deposition of sodium. In one embodiment of the invention, the electrochemical deposition of sodium is a practical requirement for an effective implementation of the present invention. This electrochemical sodium deposition takes place either during the first charging cycle for cells assembled in the discharged state, or during the preparation of thin anodic sodium films prior to cell assembly for cells assembled in the charged state. The identification of a suitable current collector substrate for such sodium deposition and a suitable electrolyte for deposition over this substrate are interrelated. In other words, only a subset of the electrolytes supporting sodium over sodium deposition is also supporting sodium deposition over current collector substrate. The disclosure of matching electrolyte—current collector substrate couples is therefore a main objective of the present invention.

In one embodiment the anode is essentially sodium free in its discharge state and/or during assembly which may be in the discharge state. Here the anode is sodium free if the weight % of sodium is preferably less than 50% and more preferably less than 30% and more preferably less than 20% and more preferably less than 10% and more preferably less than 5% and more preferably less than 3% and more preferably less than 2% and more preferably less than 1% and more preferably less than 0.5% and more preferably less than 0.3% and more preferably less than 0.2% and more preferably less than 0.1% and most preferably 0% of the total weight of the anode in its discharge state.

The anode may comprise a support/current collector of sodium or another conductive material. In one embodiment the anode is pure sodium. The anode is here considered pure sodium if the weight % of sodium is preferably greater than 50% and more preferably greater than 70% and more preferably greater than 80% and more preferably less than 90% and more preferably greater than 95% and more preferably greater than 97% and more preferably greater than 98% and more preferably greater than 99% and more preferably greater than 99.5% and more preferably greater than 99.7% and more preferably greater than 99.8% and more preferably greater than 99.1% and most preferably 100% of the total weight of the anode in its discharge state.

In one embodiment, the electrochemical deposition on the current collector material may be essentially smooth, dendrite-free and/or well-adhering. In one embodiment, the electrochemical deposition and the current collector material may be in contact. Smooth is here defined to be having a surface roughness of below 100 micron and more preferably below 50 micron and more preferably below 20 micron and more preferably below 10 micron and more preferably below 5 micron and more preferably below 2 micron and most preferably below 1 micron. Dendrite-free is here defined as having preferably less than 90% and more preferably less than 50% and more preferably less than 20% and more preferably less than 10% and more preferably less than 5% and most preferably less than 2% of the total mass of the sodium deposit as dendrites.

In a further aspect, the invention relates to disclosing cathodes, compatible with the disclosed electrolytes. Given the thousands of electrode materials described in the literature, even with respect to known electrode materials it is innovative to identify those few which simultaneously support good electron conductivity, good ion diffusivity, provide high energy density, are non-soluble in the newly disclosed electrolytes in the reduced, oxidized, or intermediate states, and are compatible with the electrochemical window of the newly disclosed electrolytes, especially considering the unexplored physical nature of the electrolytes described herein.

In a further aspect, the invention facilitates the utilization of just certain disclosed cell components, for example the use of certain disclosed cathodes in a different context, such as that of lithium-based battery electrodes, or the use of certain disclosed electrolytes in supercapacitor cells.

In a still further aspect, the invention relates to the use of electrochemical secondary batteries, comprising a number of cells according to any of the embodiments thus provided, in an electric vehicle.

In a still further aspect, the invention relates to the use said batteries in an electrical or electronic device, a power unit, a backup energy unity or a grid storage or stabilization unit.

In a still further aspect, the use of certain disclosed electrolytes in the context of any application employing ionic liquids or non-aqeuous liquids having highly concentrated salt content.

Stable cycling is here defined to be consumption of preferably less than 50% and more preferably less than 25% and more preferably less than 10% and most preferably less than 5% consumption of the electrolyte in the course of at least 10 cycles and more preferably at least 100 cycles, and more preferably at least 1000 cycles, and most preferably at least 10000 cycles.

The utility of the present invention arises from a variety of reasons depending on each particular embodiment thereof, such as high energy density per mass unit, high power density per mass unit, or improved durability. Cost-effective implementation of the battery disclosed herewith will positively affect many battery-powered products.

Sodium-based metal anodes provide some of the highest theoretical gravimetric capacities of any anode material: the gravimetric capacity of sodium is over 1100 mAh/g, along with a potential of −2.7 V vs. Standard Hydrogen Electrode (SHE) for the $Na^+/Na$ couple. For comparison, current graphite anodes for lithium-ion batteries have a gravimetric capacity of around 400 mAh/g. Furthermore, metallic anodes do not require solid-state diffusion of ions to transfer material from the charged to the discharged state, but merely the successful deposition/dissolution of the ions on/from the surface of the metal.

The term "cell" refers in this disclosure to indicate an electrochemical cell as a smallest, packed form of a battery; and the term "battery" refers to a group of cells (a stack of cells, for example), unless otherwise indicated.

Each electrochemical cell comprises, at least, an anode, a cathode and an electrolyte positioned between the anode and cathode. A cell may also comprise a separator.

Different embodiments of the present invention will become apparent by consideration of the detailed description and accompanying drawings.

BRIEF DESCRIPTION OF THE DRAWINGS

FIG. 11 shows the molecular structure of some example vat dyes according to the invention.

DETAILED DESCRIPTION OF THE EMBODIMENTS

Figure 0:
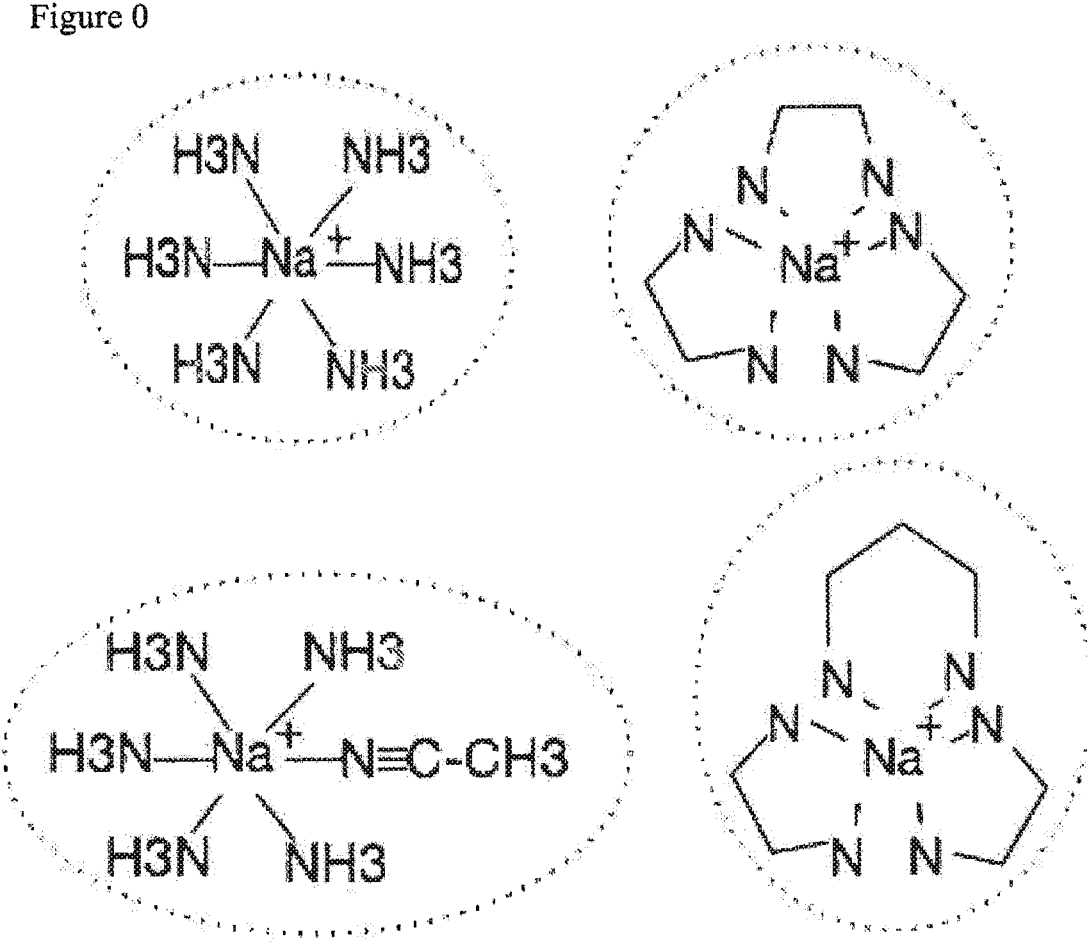
FIG. 0 shows examples of superalkali cation formations. The first two examples on the left are symmetric formations, while the last two examples on the right are asymmetric formations.

Detailed embodiments of the present invention are disclosed herein with the reference to accompanying drawings.

The following paragraphs firstly describe current collector substrate-electrolyte couples for the deposition and cycling of the metallic sodium anode. Subsequently, matching cathode compositions are disclosed for each electrolyte type.

The disclosed electrochemical cells are implemented so as to allow reversible redox interaction of metal ions with the cathode electrode during charge-discharge cycles. The term "reversible redox interaction" refers to the ability of an ion to both get inserted into and to depart from the electrode material, preferably while not causing significant degradation of the latter and therefore not exerting significant negative effect on the performance characteristics of said electrode over repeated cycling.

According to the invention, in references to carbon-coated surfaces, the carbon may be in any suitable form. Preferred forms of carbon include CNT, fullerene, CNB, graphene, graphite, Ketjen-Black, mesoporous carbon, activated carbon, carbon nanohoms, carbon nanofoam, Q-carbon, T-carbon, Y-carbon, nanocarbon, carbon nanoparticle and/or porous carbon. Other forms of carbon are possible according to the invention.

A new class of electrolytes is disclosed in the following paragraphs based on highly concentrated Sodium salts in Nitrogen-containing solvents.

The first class of disclosed electrolyte—substrate pairs are based on inorganic ammoniate electrolytes. Gonçalves et al [1] disclosed sodium iodide-liquid ammoniate (NaI.3.3 NH₃) based electrolyte for a rechargeable battery. The NaI.3.3 NH₃ electrolyte has a voltage window up to 2.6 V vs Na⁺/Na using nickel foil, stainless steel or carbon-coated aluminum foil as electrodes. However, the high costs of the NaI salt, and the heavy weight of the I⁻ anion compromise the practicability of this known electrolyte. It is therefore desirable to find cheaper and lighter liquid ammoniates, which are compatible with metallic sodium anodes. Apparently, the required quality depends not only on the salt concentration; the NaSCN.3.1 NH₃ room temperature liquid ammoniate has been tested as an electrolyte and found to be incompatible with metallic sodium, despite its even higher salt concentration.

Surprisingly, $NaBF_4.x\ NH_3$ has been discovered as a hitherto unknown close-to-room-temperature liquid ammoniate, and has been furthermore discovered to be a suitable electrolyte for metallic sodium cycling. It has a voltage window up to 2.9 V vs Na⁺/Na using aluminum, stainless steel or carbon-coated aluminum foil as electrodes. The boiling point of $NaBF_4.2.5NH_3$ is around 10° C. and the ionic conductivity has a value of 80 mS·cm⁻¹.

Moreover, $NaBH_4.x\ NH_3$ has been also discovered to be a suitable electrolyte for metallic sodium cycling. It has a voltage window of up to 2.75 V vs Na⁺/Na using stainless steel as an electrode. While the existence of $NaBH_4.1.5\ NH_3$ room temperature liquid has been previously known, $NaBH_4.x\ NH_3$ has never been tested as an electrolyte, perhaps because $NaBH_4$ is known to be a strong and fast reducing agent in other solvents. Therefore the high voltage window of this electrolyte on the one hand, and its compatibility with metallic sodium on the other hand are very surprising properties. The boiling point of $NaBH_4.1.5\ NH_3$ is ca. 18° C. and the ionic conductivity has a value of 110 mS·cm⁻¹.

Figure 9:
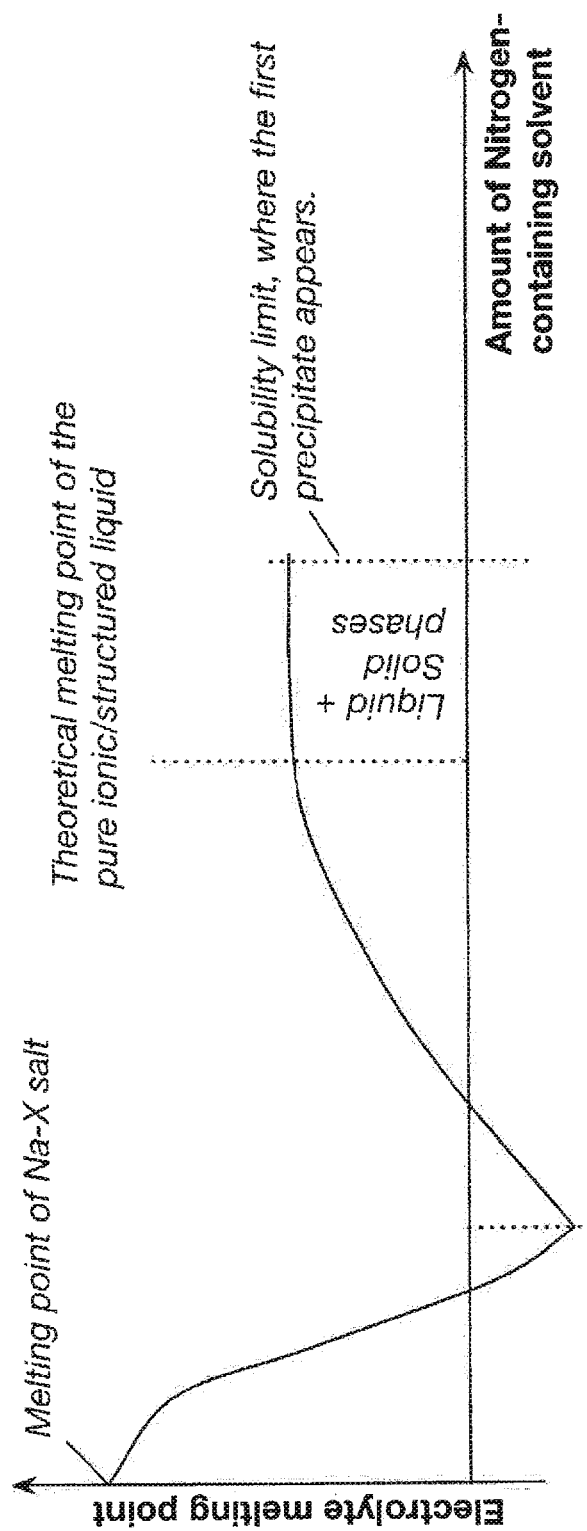
FIG. 9 illustrates the general phase diagram of concentrated electrolytes prepared from Nitrogen-based solvent precursors.

An attempt has been made to elucidate the nature of these newly discovered electrolyte specimens. Without intending to be bound by theory, experimental data of these electrolytes' melting point vs salt content, as well as their behavior with respect to the metallic sodium surface, points to their ionic liquid or to a locally ordered nature. Evidenced by their high ionic conductivity, the abovesaid electrolytes represent a new class of ultra-low viscosity electrolytes, having an order of magnitude lower viscosity than most presently used battery electrolytes. In these ionic-liquid type or locally ordered electrolytes, 6 nitrogen atoms are tightly bound or otherwise attracted to a cation, forming a superalkali complex. In case of double-charged cations, such as Ni²⁺, the resulting superalkali has too high a charge density to be liquid. However in the case of single-charged cations, such as Li⁺, Na+, K⁺, or Cu⁺, the resulting superalkali can be in liquid phase when the counter-anion is weakly coordinating, and/or when there is a mix of mismatching cation sizes in the electrolyte. Therefore the general formula of Na⁺X⁻.3 NH₃. represents a composition where half of the cations tend to be in (Na.6NH₃)⁺ superalkali state, while the other half tend to be Na⁺, with some statistical fluctuation in-between these states. The combination of cation structures' size mismatch and weakly coordinating X⁻ anion nature is sufficient to yield room temperature liquids in a certain stoichiometric range in the vicinity of the 3:1 NH₃:salt ratio. The limits of the liquid-range stoichiometry depend on the combination of salt cation specie selection (Li⁺, Na⁺, K⁺, Cu⁺), the type of amine species involved in creating the superalkali complex, and the salt anion specie selection, FIG. 9 illustrates the general phase diagram of these electrolytes in the case of the described simple two component electrolytes having an NH₃:salt ratio of X. According to the invention, X is preferrably between 0.1 and 10 and more preferably between 0.4 and 5 and more preferably between 0.7 and 4 and more preferably between 0.9 and 3.5 and more preferably between 0.95 and 3.2 and most preferably between 0.99 and 3.1. According to the invention, the simple electrolyte can be combined with other electrolytes to create electrolyte mixtures. There is a temperature-dependent concentration of free amine species in the electrolyte. As long as the concentration of these free amine species stays sufficiently low, the electrolyte stays passive with respect to the metallic sodium surface. On the cathode side, the concentration of free amine species manifests as the observed limiting overpotential for electrolyte stability, with respect to the oxidation potential of the given amine species.

In line with this conceptual discovery about the nature of the ammoniate based electrolytes, it has been discovered that this new class of electrolytes may be prepared not only from ammonia, but also from any Nitrogen-containing solvent precursor. The suitable molecules include for example a range of organic amines and nitriles. When ammonia is employed—such electrolytes are termed ammoniate-based electrolytes or liquid ammoniates—the electrolyte may be liquid in some stoichiometry in the vicinity of the ideal 3:1 NH₃:salt ratio, preferably between 0.1:1 and 100:1 and more preferably between 0.5:1 and 50:1 and more preferably between 1:1 and 20:1 and more preferably between 1.5:1 and 10:1 and more preferably between 2:1 and 5:1 and more preferably between 2.5:1 and 4:1 and more preferably between 2.8:1 and 3.5:1 and most preferably between 2.9:1 and 3.2:1. Similarly, when mono-amines are employed, selected preferably from the group of n-butylamine, n-propylamine, isopropylamine, ethyl-amine, methyl-amine, and pyridine, the electrolyte may be liquid in some stoichiometry in the vicinity of the ideal 3:1 mono-amine:salt ratio, preferably between 0.1:1 and 100:1 and more preferably between 0.5:1 and 50:1 and more preferably between 1:1 and 20:1 and more preferably between 1.5:1 and 10:1 and more preferably between 2:1 and 5:1 and more preferably between 2.5:1 and 4:1 and more preferably between 2.8:1 and 3.5:1 and most preferably between 2.9:1 and 3.2:1. Following this same principle, when di-amines are employed, selected preferably from the group of ethylenediamine and 1,3-diaminopropane, the electrolyte may be liquid in some stoichiometry in the vicinity of the ideal 1.5:1 di-amine:salt ratio, preferably between 0.1:1 and 50:1 and more preferably between 0.4:1 and 20:1 and more preferably between 0.6:1 and 10:1 and more preferably between 0.8:1 and 6:1 and more preferably between 1:1 and 3:1 and more preferably between 1.2:1 and 2:1 and more preferably between 1.3:1 and 1.8:1 and most preferably between 1.4:1 and 1.6:1. When tri-amines are employed, preferably comprising of diethylenetriamine, the electrolyte may be liquid in some stoichiometry in the vicinity of the ideal 1:1 tri-amine:salt ratio, preferably between 0.1:1 and 20:1 and more preferably between 0.2:1 and 10:1 and more preferably between 0.3:1 and 5:1 and more preferably between 0.4:1 and 3:1 and more preferably between 0.5:1 and 2:1 and more preferably between 0.6:1 and 1.4:1 and more preferably between 0.8:1 and 1.2:1 and most preferably between 0.9:1 and 1.1:1. Electrolyte melting points can be lowered by irregular cation shapes and, thus, according to the invention, the melting point of the electrolyte can be modified by employing a mixture of different amines. Examples include but are not limited to mixtures between ethylene-diamine and 1,3-diaminopropane, mixtures between ammonia and amines, or mixtures between nitriles and amines, resulting in more irregular cation shapes. Not be be bound by theory, some examples of possible superalkali formations are illustrated in FIG. 0. The melting point of 'tailed' asymmetric cation configurations is particularly effective for decreasing the electrolyte melting point and viscosity. The appropriate selection of solvent mixtures is therefore useful for achieving a decrease of melting point and viscosity. For example, it has been discovered that employing ammonia:n-butylamine solvent mixture or ammonia:n-propylamine solvent mixture in approximately 5:1 ratio, preferably between 0.1:1 and 100:1 and more preferably between 0.5:1 and 50:1 and more preferably between 1:1 and 20:1 and more preferably between 2:1 and 10:1 and more preferably between 3:1 and 8:1 and more preferably between 4:1 and 6:1 and more preferably between 4.5:1 and 5.5:1 and most preferably between 4.8:1 and 5.2:1, is especially effective for the electrolyte melting point lowering, presumably as a consequence of the cation tail effect. The use of further similar solvent mixtures to achieve an asymmetric 'tailed' superalkali configuration is also possible according to the invention. The use of organic amines instead of ammonia has a further utility of increasing the electrolyte boiling point and increasing the voltage window It has been discovered that this new class of electrolytes may incorporate nitrile based solvents, or may even be based on nitriles in case of certain salt species such as sodium bis-(trifluoromethylsulfonyl)imide. Conforming to the above-disclosed electrolyte structure, when nitriles are employed, selected preferably from the group of acetonitrile and propionitrile, though other nitriles are possible according to the invention, the electrolyte may be liquid in some stoichiometry around the 3:1 nitrile:salt ratio, preferably between 0.1:1 and 100:1 and more preferably between 0.5:1 and 50:1 and more preferably between 1:1 and 20:1 and more preferably between 1.5:1 and 10:1 and more preferably between 2:1 and 5:1 and more preferably between 2.5:1 and 4:1 and more preferably between 2.8:1 and 3.5:1 and most preferably between 2.9:1 and 3.2:1. In the case of mixed electrolytes, there is, most preferably, a one-to-one molar concentration equivalence between a nitrile, a mono-amine, and ammonia, which means that each of these compounds contribute one Nitrogen atom per molecule for the superalkali formation. The use of nitriles has a utility of further increasing the electrolyte voltage window, at the expense of decreasing the ionic conductivity and further limiting the selection of salts yielding liquid electrolytes.

Though, the electrochemistry of $Na^+$ containing salts has been investigated in detail, particularly in relation to the sodium battery application of the invention, other cation species are also possible according to the invention. For instance, in line with this conceptual discovery about the nature of the ammoniate and amine based electrolytes, it has been discovered this new class of electrolytes may be prepared, for instance, from salts comprising $Li^+$, $K^+$, or $Cu^+$ cations, and weakly coordinating anions. The employed salt may comprise anions which are weakly coordinating and are therefore generally known to be employed for making low-viscosity electrolytes. Some additional anions, such as the $BH_4^-$ or $BH_3CN-$ anion, are surprisingly found to be suitable for preparing this new class of ultra-low viscosity liquids. An additional criteria for the Sodium battery application is the anion's stability against metallic sodium and a sufficiently high oxidation potential level of at least 3 V vs $Na/Na^+$. The list of preferred anions includes $BF_4-$, $BH_4-$, $PF_6-$, $ClO_4-$, $B(CN)_4-$, $BF_3CN-$, $BF_2(CN)_2-$, $BF(CN)_3-$, $BH_3CN-$, $BH_2(CN)_2-$, $BH(CN)_3-$, $Al(BH_1)_4-$, bis-(trifluoromethylsulfonyl)imide (TFSI-), bis (fluorosullonypimide (FSI-), trifluoromethanesulfonate (Triflate-), while other anion species are also possible according to the invention. The $SCN^-$ anion in isolation is excluded from the battery application because of its reactivity with metallic Sodium, however, it may be used in combination with other agents that reduce or negate this reactivity.

Concerning the feasible range of amine:salt or ammonia: salt ratios for supporting metallic sodium cycling, preferred ratios have been explored. For example, with the $NaBF_4.x$ $NH_3$ system a suitable salt:ammonia ratio for metallic sodium cycling, where x, the ratio of $NH_3$ to salt, can preferably range from 1 to 6, and more preferably, from 1.5 to 5 and more preferably from 2 to 4 and more preferably from 225 to 3 and more preferably from 23 to 2.7 and more preferably from 2.4 to 2.6 and most preferably it is adjusted to about 2.5. Excess solvent with respect to the abovesaid ratio is desirable in the case that the melting point needs to be lowered. A higher $NaBF_4$ salt ratio with respect to the abovesaid ratio is desirable in the case that a higher electrolyte boiling point is desired, since an excess of the $NaBF_4$ salt may facilitate the superalkali re-formation prior to the $NH_3$ evaporation taking place. Excess salt with respect to the abovesaid ratio is desirable in the case that the boiling point needs to be raised. In case of $NH_3$-free, i.e. purely organic amine based electrolyte formulation, the boiling point is sufficiently high, and it is generally useful to find the salt:amine ratio which minimizes the electrolyte melting point. In the case of excess $NH_3$ according to the invention, x may vary from greater than 0 to less than 0.5 and more preferably, from greater than 0 to less than 1.0 and more preferably from greater than 0 to less than 2 and more preferably from greater than 0 to less than 2.4 and most preferably from greater than 0 to less than 2.5. In the case of excess salt according to the invention, x may, in that case, vary from greater than 10 to 100 and more preferably, from greater than 5 to 100 and more preferably from greater than 3 to 1.00 and more preferably from greater than 2.6 to 100 and most preferably from greater than 2.5 to 100.

Similarly, it has been discovered that with the $NaBH_4.x\ NH_3$ system is a suitable salt:ammonia ratio for metallic sodium cycling where x, the ratio of $NH_3$ to salt, can preferably vary from 0.5 to 6 and more preferably, from 0.75 to 5 and more preferably from 1 to 3 and more preferably from 1.25 to 2 and more preferably from 1.3 to 1.7 and more preferably from 1.4 to 1.6 and most preferably it is adjusted to about 1.5. Excess solvent with respect to the abovesaid ratio is desirable in the case that the melting point needs to be lowered. Excess salt with respect to the abovesaid ratio is desirable in the case that the boiling point needs to be raised. In comparison with the $NaBF_4.x\ NH_3$ system, the $NaBH_4.x\ NH_3$ system can accommodate a higher salt ratio before freezing up. In the case of excess $NH_3$ according to the invention, x may vary from greater than 0 to less than 0.5 and more preferably, from greater than 0 to less than 1.0 and more preferably from greater than 0 to less than 1.25 and more preferably from greater than 0 to less than 1.4 and most preferably from greater than 0 to less than 1.5. In the case of excess salt according to the invention, x may, in that case, vary from greater than 5 to 100 and more preferably, from greater than 2 to 100 and more preferably from greater than 1.75 to 100 and more preferably from greater than 1.6 to 100 and most preferably from greater than 1.5 to 100.

Other electrolytes comprising one or more salts of which at least one comprises sodium and a weakly coordinating boron, aluminum, phosphorus or chlorine cored anion and a solvent comprising compound selected from the group of ammonia and organic amines are possible according to the invention. Cored, here means, containing the referred to element as the molecules core element. Examples include but are not limited to $BF_4-$, $BH_4-$, $PF_6^-$, $ClO_4-$, $B(CN)_4-$, $BF_3CN-$, $BF_2(CN)_2-$, $BF(CN)_3-$, $BH_3CN-$, $BH_2(CN)_2-$, $BH(CN)_3-$, $Al(BH_4)_4-$. In one embodiment of the invention the solvent may comprise one or more compounds selected from the group of organic amines, and preferably comprises ethylenediamine (EDA). When the electrolyte system is based on mono-amines, a suitable salt:amine ratio for metallic sodium cycling may be such that the electrolyte system acquires the above described highly concentrated state; to achieve such state the ratio x of the mono-amines:salt ratio preferably can vary between 1 and 6 and more preferably, between 2 and 5 and more preferably between 2.5 and 4 and more preferably between 2.75 and 2.5 and most preferably between 2.9 and 3.1. When the electrolyte system is based on di-amines, a suitable salt:amine ratio for metallic sodium cycling may be such that the electrolyte system acquires the above described highly concentrated state; to achieve such state the ratio x of the mono-amines:salt can preferably vary between 0.5 and 3 and more preferably, between 1 and 2 and more preferably between 1.2 and 1.8 and most preferably between 1.4 and 1.6. When the electrolyte system is based on tri-amines, a suitable salt:amine ratio for metallic sodium cycling is such that the electrolyte system acquires the above described highly concentrated state; to achieve such state the ratio x of the mono-amines:salt can preferably vary between 0.3 and 2 and more preferably, between 0.5 and 1.5 and more preferably between 0.7 and 1.2 and most preferably between 0.9 and 1.1. Mixtures of the abovesaid electrolytes are possible according to the invention; the corresponding amine:salt ratios may be adjusted according to the principles described in this paragraph.

It has been surprisingly discovered that employing a mixture of salts may facilitate reaching the abovesaid new class of electrolytes, when the solvent is fully or nearly fully in a superalkali state. With only $NaBF_4$ salt, the highest possible dissolved salt concentration which can be obtained in Ethylene-diamine is $NaBF_4$ 3.33 Ethylene-diamine. With only NaBr salt, the highest possible dissolved salt concentration which can be obtained in Ethylene-diamine is NaBr 3.15 Ethylene-diamine. However, when using a mixture of $NaBF_4$ and NaBr salts, it is possible to obtain a more concentrated electrolyte, with the composition of (y $NaBF_4$+ (1−y) NaBr).x Ethylene-diamine, where x<3. The preferred $NaBF_4$:NaBr ratio is between 0.1:0.9 and 0.9:0.1, and more preferably between 0.3:0.7 and 0.7:0.3, and most preferably between 0.4:0.6 and 0.6:0.4. Similarly, mixtures of other salts may be useful for reaching a highly concentrated electrolyte with Ethylene-diamine or some other abovesaid Nitrogen-containing solvent. In a preferred embodiment the salt concentration is high enough ensure that the electrolyte essentially does not have free solvent molecules. In a preferred embodiment the electrolyte is an ionic liquid.

Figure 1:
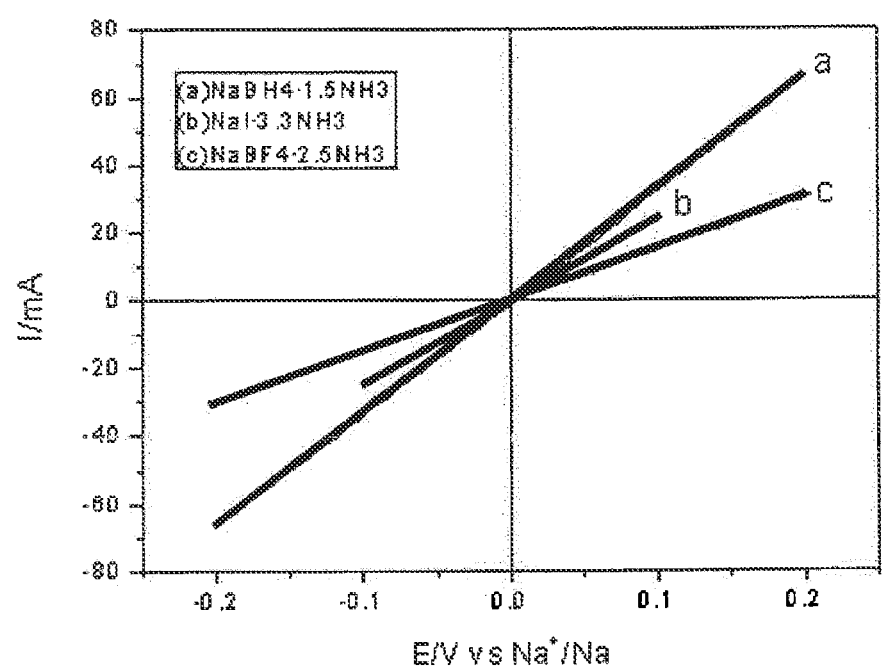
FIG. 1 shows the electrochemical behavior of sodium deposition over sodium in different liquid ammoniates ($NaI.3.3NH_3$, $NaBF_4.2.5NH_3$ and $NaBH_4.1.5NH_3$). The experiments were performed in a three-electrode cell at a sweep rate of 20 mV/s using sodium metal as a reference and counter electrodes. The geometric area of the working electrode is 1 $cm^2$ for all the three experiments.

FIG. 1 shows the comparative sodium deposition/stripping voltammograms for the abovesaid ammoniate-based electrolytes.

While most current collector materials do not facilitate an anodic substrate for smooth sodium deposition in the abovesaid ammoniate electrolytes, it has been unexpectedly discovered that copper current collector supports smooth and well-adherent sodium deposition in the abovesaid ammoniate electrolytes.

Figure 10:
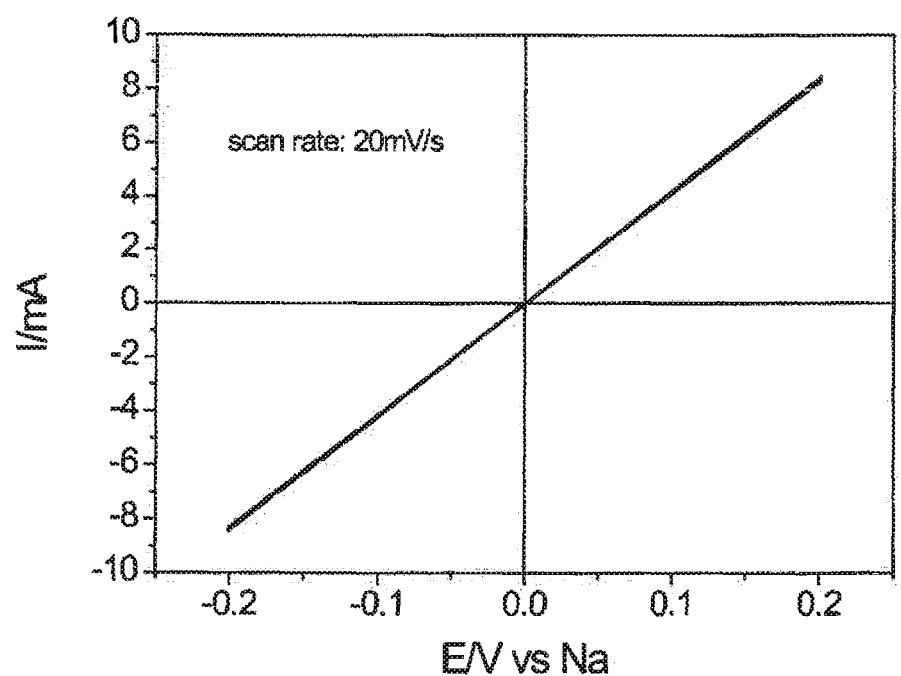
FIG. 10 shows the electrochemical behavior of sodium deposition over sodium with 4 Molar $NaBF_4$ salt in Ethylenediamine. The experiments were performed in a three-electrode cell at a sweep rate of 20 mV/s using sodium metal as a reference and counter electrodes. The geometric area of the working electrode is 1 cm².
Figure 12:
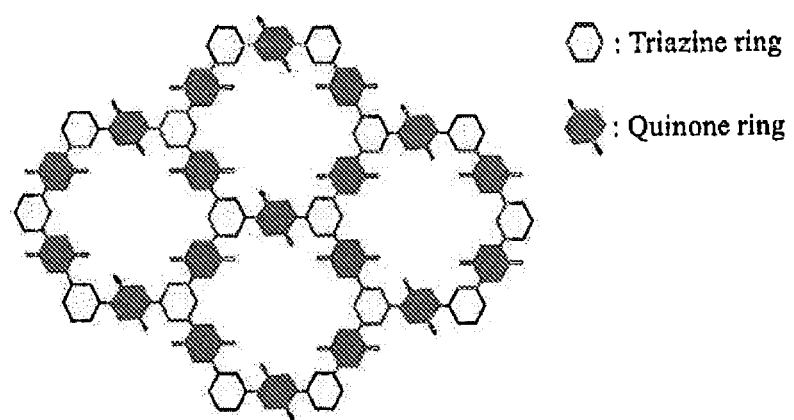
FIG. 12 shows the molecular structure of the Triazine-Quinone co-polymer cathode material, which can be described by the $[C_8H_2N_2O_2Na_2]n$ formula.

It has been surprisingly discovered that a subset of the abovesaid solvents supports the smooth deposition and cycling of metallic sodium over copper current collector even when the salt concentration is only between 03 and 1.0 times the minimum concentration required for all solvent molecules to be involved in superalkali formation; i.e. it is less than what is required for a proper ionic liquid or a locally ordered formation. The electrolyte system may, thus, contain a significant amount of free amines or nitriles in this concentration range. Without intending to be bound by theory, this behavior is thought to be caused by a thin SEI forming capability of the employed electrolyte which is suitable for a smooth metallic sodium deposition, and the still relatively high salt concentration's beneficial effect against the sodium dissolution or reactivity. The use of ethylenediamine solvent or a mixture of solvents mainly based on ethylenediamine is preferred in this operating region, due to the obtained electrolytes' very high ionic conductivity and high sodium deposition rate capability. The anode may then achieve nearly 10 mA/cm$^2$ current at 0.2 V overpotential. The use of $NaBF_4$ or $NaBH_4$ salts with ethlyenediamine is particularly preferred in this operating region. This system achieves its maximum ionic conductivity at a 4 M salt concentration. FIG. 10 shows the sodium deposition/stripping voltammogram for the abovesaid 4 molar ethlyenediamine-based electrolyte.

The following table summarizes the observed qualities of the electrolyte categories disclosed in this invention. These liquid formulations, which may be, for instance, ionic liquid type formulations, may be useful also for other applications beyond the scope of batteries and supercapacitors scope.

| Nitrogen-containing main ingredient class | Ionic conductivity | Approximate range of boiling points | Stability against Sodium | Voltage window vs Na/Na+ |
|---|---|---|---|---|
| Ammonia | 100 mS/cm range | 10-30° C. | No reaction | 2.7-2.9 V |
| Organic amines-ionic liquid forming concentration range or high concentration range for locally ordered state | 5-15 mS/cm range | 50-100° C., depending on the amine type | No reaction | 3.3-3.5 V |
| Organic amines-lower than ionic liquid concentration or locally ordered concentration range, having also free solvent molecules | 10-30 mS/cm range with ethylene-diamine, lower for other amines | 50-100° C., depending on the amine type | Very low reactivity, can be counteracted by SEI formation | 3.1-3.3 V |
| Nitriles-ionic liquid forming concentration range or high concentration range for locally ordered state | 10 mS/cm range | 80-100° C. | Low reactivity, can be counteracted by SEI formation | 4.8 V |

Regarding a suitable cathode material for use in conjunction with the above-described electrolyte-substrate couple, several high-performing cathode materials are identified below for the construction of a complete electrochemical cell.

Poly-AnthraQuinonyl Sulphide (PAQS) has been previously investigated as an electrode material in organic electrolytes [2]. However, this polymer has some solubility in organic solvents, which hinders its practical utilization in organic electrolytes. In contrast, PAQS is found to be insoluble in the ammoniate-based electrolytes during the cycling process, and has demonstrated good electrochemical performance, in terms of suitable energy density, high power density, and cycling stability. The theoretical attainable capacity of this material is found to be about 210 mAh/g (referred to active material).

Figure 2:
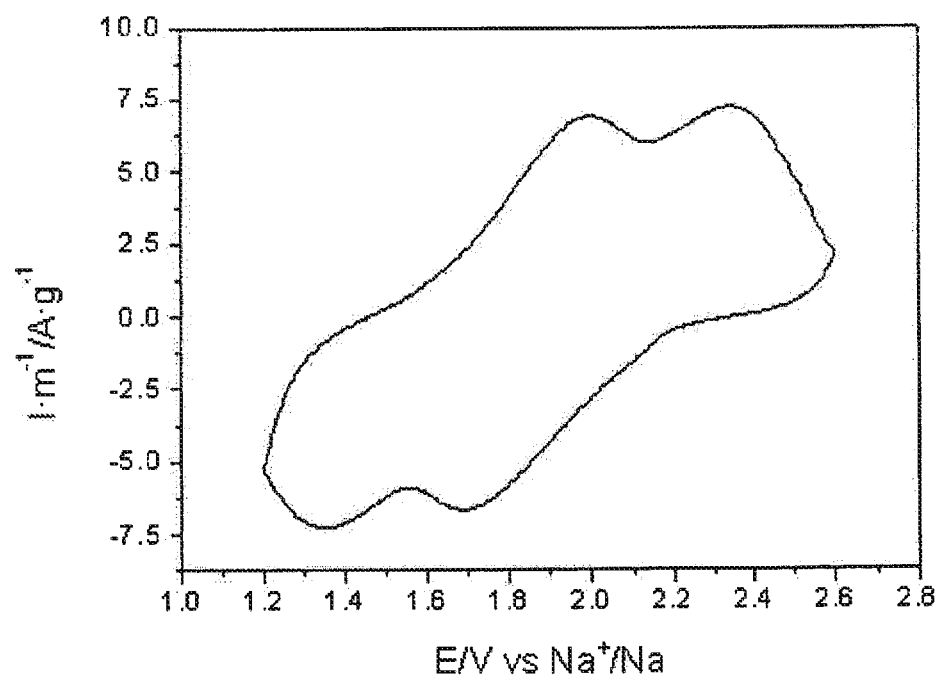
FIG. 2. shows the cyclic voltammogram for a PAQS electrode in $NaI.3.3NH_3$. The experiment was performed in a two-electrode split cell at a sweep rate of 20 mV/s using sodium metal as a reference and counter electrode. The current is referred to the active mass of PAQS, 4.8 mg, with a geometric exposed area of 1.1 $cm^2$.

FIG. 2 shows a cyclic voltammogram for a PAQS-based electrode in the NaI.3.3 $NH_3$ liquid ammoniate.

Furthermore, it has been found that hitherto unknown AnthraQuinonyl Sulphide oligomers (AQS-oligomers) retain the same insolubility than PAQS in the abovesaid liquid.

It has been discovered that, in general, vat dyes based on anthraquinone derivatives with high molecular weights, and, in particular, the family of anthrimidocarbazoles, as well as their mixtures, have a good cathode performance, and because of their insolubility in the aforementioned electrolytes, allow for long term cycling with small loss of capacity. While these materials have been widely used for tinting and coloring [3], their potential use as electrode materials have been hitherto unknown. The theoretical attainable capacity of these materials is around 240 mAh/g with respect to the active material mass. Some examples of these dyes are: indanthrone blue (IB, also known as Pigment Blue 60, Vat Blue 4, CI 69800, CAS 81-77-6), the bisanthraquinoyl known as Pigment Red 177 (also known as Cromophtal Red A3B, CI65300, CAS 4051663-2), Vat Orange 11 (Cibanoneyellow3R, CI 70805, CAS 2172-33-0), Vat Brown 1 (Cibanon Brown, CI 70800, CAS 2475-33-4), Vat Green 8 (Indanthrene Khaki, Vat Khaki 2G, CI 71050, CAS 14999-97A) and Vat Yellow 28 (Indanthren Yellow FFRK, CI 69000).

Other vat dyes based on anthraquinone derivatives including but not limited to anthrimidocarbazoles are possible according to the invention. PAQS, AQS-oligomers and vat dyes are, in general, classified as carbonyl based compounds. Other carbonyl based compounds, particularly those with low solubility in ammoniate and amine based electrolytes, are possible according to the invention.

Figure 3:
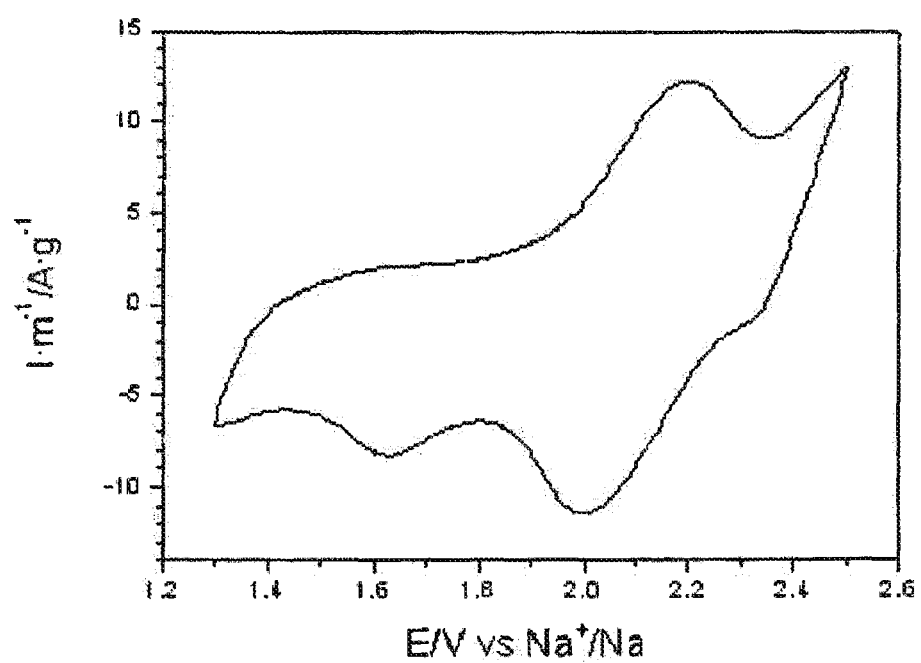
FIG. 3. shows the cyclic voltammogram for an indanthrone blue electrode in $NaI.3.3NH_3$. The experiment was performed in a two-electrode split cell at a sweep rate of 20 mV/s using sodium metal as a reference and counter electrode. The current is referred to active mass, 2 mg of indanthrone blue, with a geometric exposed area of 1.1 $cm^2$.

FIG. 3 shows a cyclic voltammogram for an 1B based electrode in the NaI.3.3 $NH_3$ liquid ammoniate.

The abovesaid ammoniate based electrolytes have the further utility of supporting a straightforward preparation of anodic sodium electro-deposition for cell assembly in the charged state. Because of the very high capacity of a metallic sodium anode, only a very thin anode film is required, which is difficult to prepare by means other than electro-deposition. The electro-deposition of a precise sodium thickness is also useful in preventing cell degradation due to any overly deep self-discharge during the battery operation. The sodium over copper deposition remains non-dendritic and well-adherent in this electrolyte even at very high deposition current rates. An exemplary setup for such anodic electro-deposition consists of a separator-covered flat sodium surface, immersed into the ammoniate-based electrolyte. The copper film is placed onto this separator, and an electro-depositing current is applied between this copper film and the sodium metal underneath. The copper film may be flipped around at the middle of the process for uniform sodium deposition onto both sides.

Sodium may also be deposited on both sides simultaneously according to the invention.

It has been discovered that a battery cell may be assembled in the charged state by using a source of sodium, without requiring uniform deposition across all the anode surfaces. The source of metallic sodium includes but is not limited to bulk sodium, metallic sodium foil, metallic sodium powder, or mixture therefrom. This source of sodium piece is placed in electric contact with the anode terminal during the assembly. For example in case of a pouch cell type cell assembly, a piece of sodium foil may be placed over one of the anodic current collectors, with the said sodium foil having the mass of the total amount of sodium required in the cell. Such assembly has twofold advantages; the sodium deposition step may be skipped, and furthermore the sodium reactivity is reduced in proportion to its total surface area. Subsequently to the cell assembly, the cell may be discharged simply by connecting its terminals through a resistor, whereby the resistance value is adjusted to yield suitably slow discharge rate for ensuring uniform discharge across all cathode material, without any significant voltage drop gradient. As a general rule for the timing of this first discharge, the intended normal cell discharge rate is multiplied by the ratio of longest cell dimension to electrode thickness. For example, in case of a cell designed for 15 minute discharge rate, having 80 mm length dimension, and 0.1 mm cathode thickness, the suitable timing of the first discharge is preferably above 1 hour and more preferably above 2 hours and more preferably above 5 hours and more preferably above 10 hours and more preferably above 20 hours and more preferably above 50 hours and more preferably above 100 hours and most preferably in the order of 200 hours. In subsequent charge-discharge cycling, the electro-chemical reactions take place between the electrodes facing each other, resulting in essentially uniform metallic sodium deposition across all current collector surfaces. This hereby disclosed assembly method takes advantage of the enhanced ionic conductivity of the abovesaid electrolyte formulations; in contrast, with traditional electrolyte formulations such assembly method would require a several times longer first discharging time.

The electrodes made from carbonyl-type PAQS, AQS oligomers, or vat dye materials such as IB, are suitable for cell assembly in the charged state. Moreover, in the case of the TB material based electrodes it has been found that after being electrochemically reduced to their maximum reversible capacity, they remain stable in dry air for sufficiently long time to be employed for cell assembly also in the discharged state. Ammoniate based electrolytes furthermore support a cost-effective electrochemical reduction of a cathode electrode, reducing it from the charged state to the discharged state. The prepared film may be placed onto this separator, and then allowed to discharge at a suitable rate till the desired voltage threshold (e.g. 1.4 V) has been reached with respect to the $Na^+/Na$ reference. The effectiveness of this process stems from the high ionic conductivity of the ammoniate-based electrolyte, and its self-infusion into the electrode porous structure. In particular, it has been found that electrodes based on indanthrone blue active material can be reduced through this method within just a few minutes, all the way to near their maximum reversible capacity. Alternatively to the electrochemical reduction of the cathode material, a chemical reduction route may be also employed to obtain the abovesaid cathode materials in the discharged state. Such chemical reduction may be carried out for example by immersing the employed cathode material into a liquid solution of a suitable reducing agent capable of discharging the cathode material till the desired voltage threshold potential with respect to the $Na^+/Na$ reference, which should not be lower than 1.4 V in order to avoid the degradation of the cathode material, followed by filtration and drying of the cathode material.

Carbonyl-type, cored and based compounds are here defined as compounds containing carbonyl groups or their derivatives. Other carbonyl-type/carbonyl based compounds, in addition to PAQS, AQS oligomers, or vat dye materials such as LB, may be suitable for cell assembly in the charged state according to the invention.

A glass microfiber separator has been found to work properly with the abovesaid liquid ammoniates. In addition, these electrolytes are also wetting well and chemically compatible with separators having a hydrophilic surface, such as a hydrophilic type polypropylene separator.

Any other separator materials in addition to the abovesaid are possible according to the invention including but not limited to polyethylene, polyvinyl chloride, polytetrafluoroethylene, polyvinylidine chloride, polyethylene, LDPE and HDPE. In the absence of inherent wetting, the electrolyte may be filled in through the application of sufficient pressure.

The following paragraphs describe the production of energy-density-optimized battery cells, employing metallic sodium-anodes. A high energy density can be obtained from sodium-anode-based cells using $NaAlCl_4 \cdot xSO_2$ type electrolyte. Under ambient pressure and room temperature conditions, x is preferably in the range of 1.5 to 2.0. The use of such electrolyte in the context of sodium over sodium deposition-dissolution has been published in [4-6]. Besides the use of pure $NaAlCl_4$ salt for complexing with $SO_2$, it was found that a salt mixture may also be used, consisting of some mixture between $NaAlCl_4$ and an additional salt. Examples of preferred additional salts suitable for mixing with $NaAlCl_4$ include $NaBF_4$ and $NaAl(BH_4)_4$. A potential benefit of employing a mixture of salts is to achieve a lower salt:$SO_2$ mass ratio at ambient temperature than in the case of $NaAlCl_4 \cdot xSO_2$. The term "$SO_2$ based electrolyte" refers in this document to the use of $SO_2$ solvent with either just $NaAlCl_4$ salt, or with some mixture between $NaAlCl_4$ and the above-mentioned additional salts.

According to the invention, x of $NaAlCl_4 \cdot xSO_2$ electrolyte composition can vary from 0.5 to 10 and more preferably, from 1 to 5 and more preferably from 1.25 to 3 and most preferably from 1.3 to 2.5. Other salts or mixtures of salts of which at least one comprises sodium and/or boron are possible according to the invention.

There are a few preceding publications relating to the construction of a battery cell employing $NaAlCl_4 \cdot xSO_2$ electrolyte [4-6]. These publications describe the construction of a certain battery cell type in the charged state. However, it is more desirable to manufacture battery cells in the discharged state. One aim of this document is therefore to disclose a practical solution for assembling a discharged-state battery employing $SO_2$ based electrolyte, which supports the deposition of metallic sodium. A copper foil immersed into $SO_2$ based electrolyte synthesized under ambient air is corroded rather quickly, thus becoming an unsuitable current collector substrate. Surprisingly, it has been discovered that, by synthesizing the $SO_2$ based electrolyte with the exclusion of significant water contamination, and by ensuring, for instance, that it is subsequently not exposed to air moisture, the copper foil immersed into this dry $SO_2$ based electrolyte is stable, and remains non-corroded. Moreover, it has been unexpectedly discovered that a copper current collector allows the preparation of smooth and well adherent sodium deposition in the abovesaid $SO_2$ based electrolyte. Thereby the combination of essentially moisture-free $SO_2$ based electrolyte and an anodic current collector made from copper or copper-based alloys supports the discharged state assembly of sodium-anode-based cells.

Figure 4:
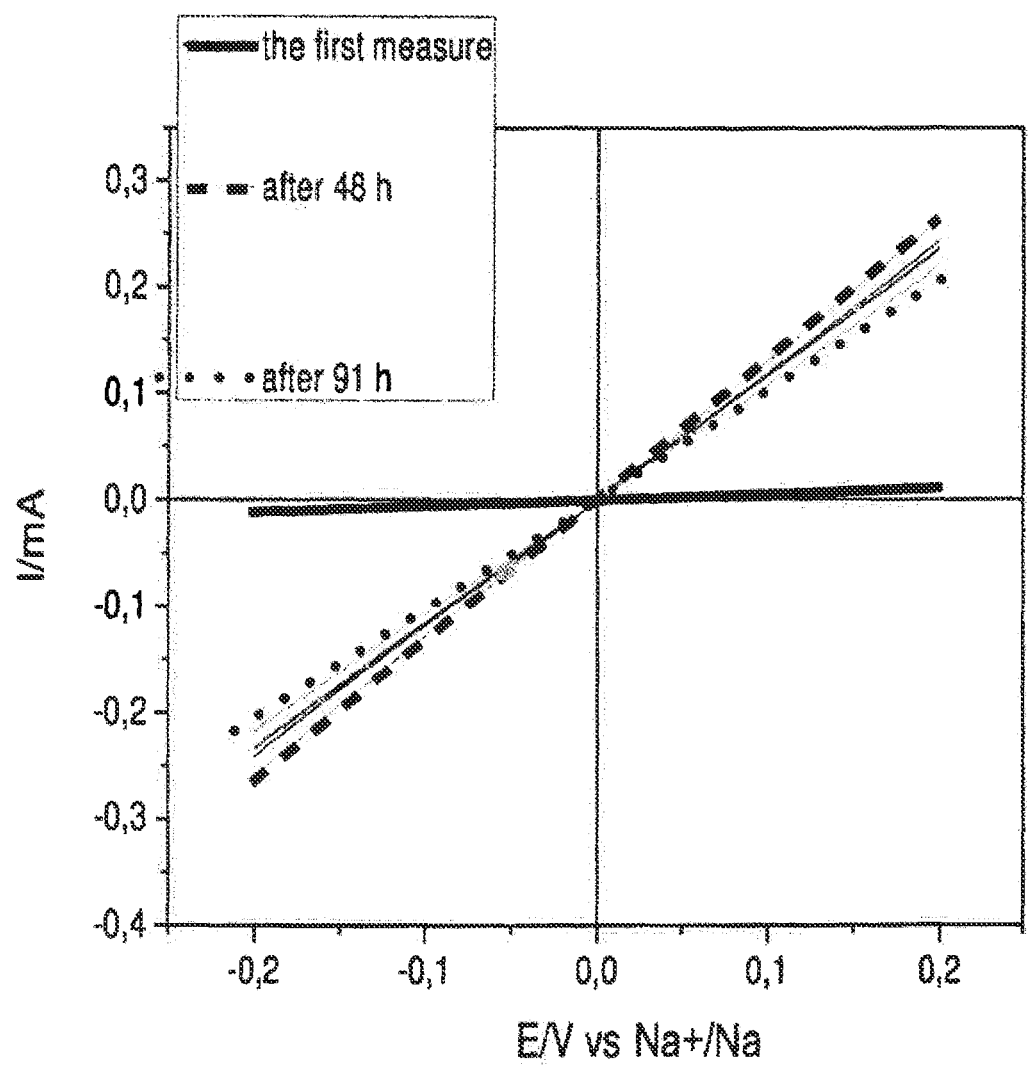
FIG. 4 shows the electrochemical behavior of sodium deposition over sodium in the $NaAlC_4.2SO_2$ electrolyte. The experiments were performed in a three-electrode cell at a sweep rate of 5 mV/s using sodium metal as a reference and counter electrode. The geometric exposed area of the working electrode is 1 $cm^2$.

FIG. 4 shows a typical exemplary Sodium deposition/stripping voltammogram of the abovesaid $SO_2$ based electrolytes, indicating also the time-wise stability of the anode operation.

We have discovered two types of cathode materials which complement the abovesaid anode-electrolyte system, correspond to the discharged state of the cathode, and provide very high energy density of the overall battery cell. The first type of cathode material is NaCl. In the preferred embodiment, NaCl is deposited over a porous carbon framework. The employed porous carbon framework has a surface area between 10 and 5000 $m^2/g$, and more preferably at least 1000, and more preferably at least 2000 and most preferably at least 3000 $m^2/g$. Such deposition may be carried out for example by using anhydrous methanol as a solvent for NaCl, which is then deposited over the porous carbon framework by immersing the carbon into the solution, evaporating the solvent, and drying.

Other solvents and deposition techniques are possible according to the invention.

In a preferred embodiment, all or part of the NaCl or other sodium-containing material comprising the cathode does not originate from the electrolyte. In a preferred embodiment, the NaCl or other sodium-containing material comprising the cathode is deposited in the prepared cathode before assembly. In one embodiment, the electrolyte salt is the source of less than 100% and more preferably less than 90% and more preferably less than 80% and more preferably less than 70% and more preferably less than 60% and most preferably less than 50% of the weight % of NaCl or other sodium-containing material comprising the cathode.

Figure 5:
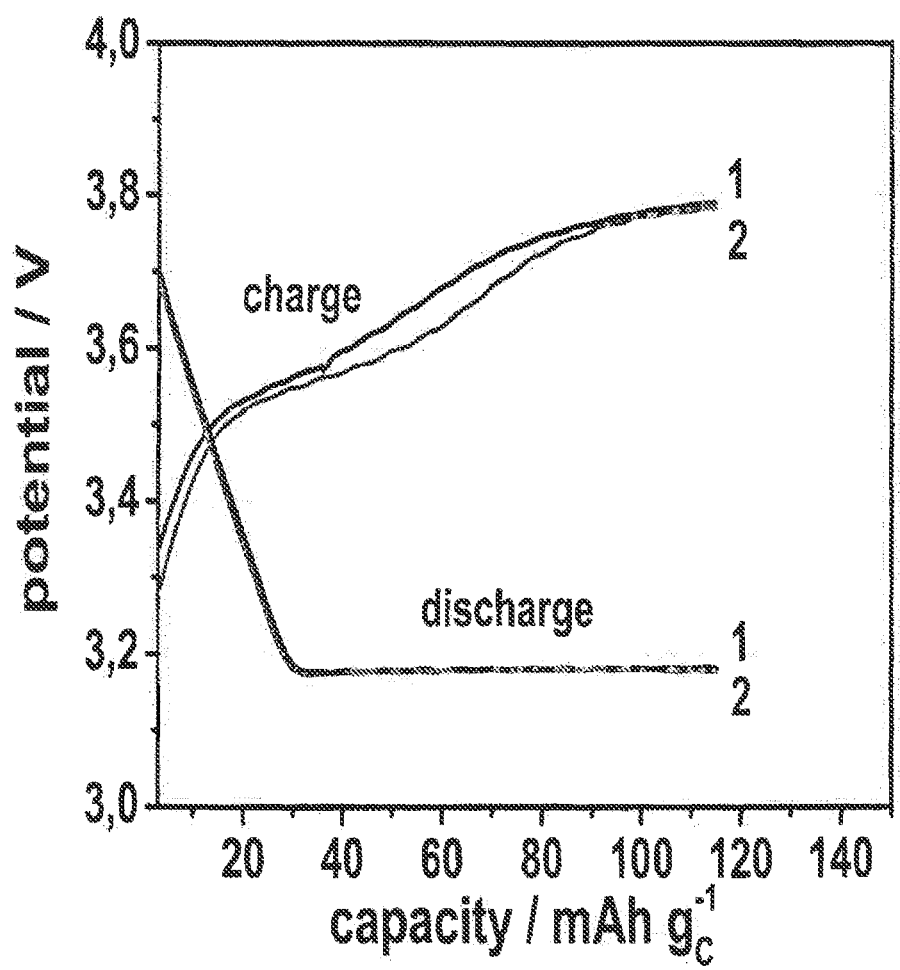
FIG. 5 shows the cell voltage evolution during charge/discharge cycling of NaCl active material in the $NaAlCl_4.2SO_2$ electrolyte. The capacity is indicated with respect to the carbon mass, and the charging limit corresponds to the complete charging of the NaCl active material. The experiments were performed in a coin cell, using sodium metal as a counter electrode. The geometric exposed area of the working electrode is 1 $cm^2$.
Figure 6:
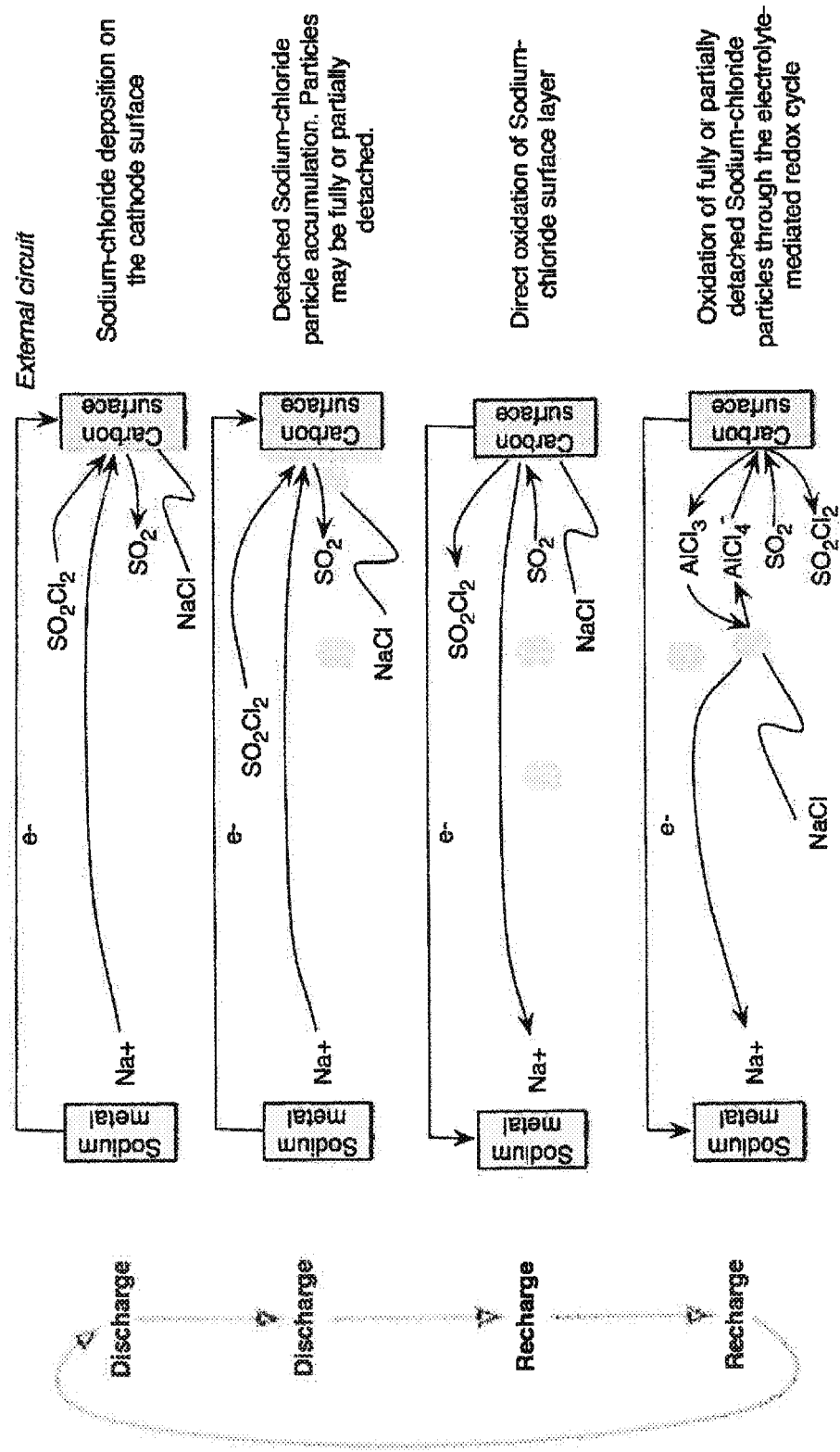
FIG. 6 depicts the proposed chemical processes occurring during the charge/discharge cycling measurements indicated in FIG. 5. Note, that the NaCl particles do not need to be fully detached from the carbon framework.

The obtained cathode material supports highly reversible battery cell operation and, approximately, 3.2 V average cell voltage during the discharge procedure. FIG. 5 shows the cell voltage evolution during charge/discharge cycling, when employing Ketjen-Black material as a carbon framework (1400 $m^2/g$ surface area). Without intending to be bound by theory, FIG. 6 depicts the proposed chemical processes during the cycling of this cell system. During the charging cycle, $SO_2Cl_2$ is generated through the $2Cl^- + SO_2 \rightarrow SO_2Cl_2 + 2e^-$ oxidation reaction. There are two significant properties of the carbon framework enabling this charging cycle. Firstly, NaCl preferentially crystallizes in such a way that it does not passivate the electrode surface. In other words, the thin layer of NaCl does not significantly cover the carbon surface, which explains why the charging voltage starts from the relatively low value of 3.3-3.35 V. Secondly, carbon acts as a catalyst for $SO_2Cl_2$ formation, preventing the build-up of high $Cl_2$ pressure [7]. Since most NaCl material is electrically detached from the carbon surface, the charging process requires also the $AlCl_3 + NaCl \rightarrow NaAlCl_4$ reaction, which consumes the NaCl particles as depicted in FIG. 6. The production of $AlCl_3$ takes places with electron transfer at the carbon surface ($2AlCl_4^- + SO_2 \rightarrow 2AlCl_3 + SO_2Cl_2 + 2e^-$). Therefore the role of the $NaAlCl_4$ electrolyte salt is also essential for cell operation. The discharge operation is the reverse procedure. The downward sloping part of the discharge curve corresponds to the growth of the NaCl layer over the cathode surface, together with the discharge of the electrochemical double layer of the carbon framework, while the flat part of the discharge curve corresponds to the growth of detached NaCl particles. Thereby the only limitation in the amount of NaCl which may be accommodated in the carbon pores is the condition that these pores must not be completely blocked. The other requirement for reversible cell operation is that the SEI layer on the metallic anode side must not be damaged during the charging cycle. It has been discovered that the SEI over the anodic sodium metal remains stable at least till 4.2 V charging voltage, suffers only limited damage up to 4.3 V charging voltage, and gives rise to a shuttle reaction of the cell if the charging voltage exceeds the 4.3 V threshold. The 3.8 V voltage at the end of charging in FIG. 5 corresponds to the conversion of approximately half of $SO_2$ into $SO_2Cl_2$, and the 4.2 V charging voltage threshold accommodates the nearly full conversion of $SO_2$ into $SO_2Cl_2$. This cell behavior is remarkably different from the Li-analogue of this cell structure [8], where attempts to recharge LiCl in $LiAlCl_4.xSO_2$ electrolyte have failed because of the combined effects of LiCl passivation on the cathode side and SEI breakdown on the anode side. The operating principle of this cell is also different from the cell operation described in [4], which employs the redox reactions of the electrolyte itself. Therefore this disclosure describes hitherto unknown battery cell chemistry.

In the case of employing just $NaAlCl_4$ salt, the energy density of the cell is optimal when it is assembled with an $NaAlCl_4.2SO_2$ electrolyte composition, i.e. employing the highest possible $SO_2$ concentration at ambient conditions. The theoretical energy density of such cell employing NaCl active material can be calculated according to the following reaction equation:

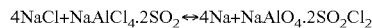

$$4NaCl+NaAlCl_4.2SO_2 \leftrightarrow 4Na+NaAlO_4.2SO_2Cl_2$$

This reaction corresponds to a theoretical capacity of 184 mAh/g with respect to the active material plus electrolyte mass. The corresponding energy density has only slight dependence on the carbon framework surface area; a larger surface area carbon because of the larger double layer contribution extends the downward sloping voltage region relative to the 3.18 V flat voltage region. The overall average discharge voltage remains close to the 3.2 V level with any suitable carbon framework. Therefore the corresponding theoretical energy density of this cell type is approximately 590 Wh/kg. It is also remarkable that the round-trip energy efficiency has a value of ca. 85%. An exemplary cell has been constructed by employing Ketjen-Black carbon framework over aluminum current collector for the cathode side, copper foil as anode side current collector, and essentially moisture-free $NaAlCl_4.2SO_2$ electrolyte. The internal spaces of the carbon framework have been filled in by x NaCl: $NaAlCl_4.2SO_2$ where molar ratio x is 4:1 (i.e. 2:1 molar ratio between $NaCl:SO_2$), through the above-described solvent evaporation-based NaCl deposition and subsequent electrolyte filling. It has been possible to charge the resulting cell, demonstrating that this theoretical capacity can be obtained in an actual cell to a very large extent.

Other molar ratios between x NaCl $NaAlCl_4.2SO_2$ are possible according to the invention. x preferably is between 1 and 40 and more preferably between 2 and 20 and more preferably between 3 and 10 and more preferably between 3.5 and 4 and more preferably between 3.75 and 4.5 and more preferably between 3.9 and 4.1. In order to reach as close to the theoretical cell capacity as possible, it is desirable for the $NaCl:SO_2$ molar ratio to be as close to 2:1 (x as close to 4) as possible. In practical cells, the amount of useful NaCl may be limited by the carbon morphology of the cathode or by the melting point limitation of the intended operating temperature range. In the case that excess $NaAlCl_4.2SO_2$ is desirable, x/2 may, in that case, vary from greater than 0 to less than 1 and more preferably, from from greater than 0 to to less than 1.5 and more preferably from from greater than 0 to to less than 1.75 and more preferably from from greater than 0 to to less than 1.9 and most preferably from from greater than 0 to to less than 2. In the case that excess NaCl is desirable, x/2 may, in that case, vary from greater than 20 to 500 and more preferably, from greater than 10 to 400 and more preferably from greater than 5 to 300 and more preferably from greater than 2.5 to 200 and most preferably from greater than 2 to 100.

A second discovered cathode material for use with an $SO_2$ based electrolyte is dehydrated $Na_2S_2O_4$ (sodium-dithionite) x $NaAlCl_4$ mixture employed preferably in an approximately 1:1 molar ratio (x=1). In the preferred embodiment, $Na_2S_2O_4:NaAlO_4$ mixture is deposited over a porous carbon framework. The employed porous carbon framework has a surface area between 10 and 5000 $m^2/g$, and more preferably at least 1000, and more preferably at least 2000 and most preferably at least 3000 $m^2/g$. Such deposition may be carried out for example by using anhydrous methanol, glyoxal, liquid formaldehyde, or methanol-formaldehyde mixture as a solvent for this $Na_2S_2O_4$:$NaAlCl_4$ mixture, which is then deposited over the porous carbon framework by immersing the carbon into the solution, evaporating the solvent, and drying.

Molar ratio x for dehydrated $Na_2S_2O_4$ (sodium-dithionite):$NaAlCl_4$ may vary between 0.01 and 100 and more preferably between 0.25 and 4 and more preferably between 0.5 and 2 and more preferably between 0.75 and 1.5 and more preferably between 0.9 and 1.1 and most preferably approximately 1. Excess $Na_2S_2O_4$ is desirable in the case that the cell has been assembled with a very concentrated electrolyte, such as $NaAlCl_4.1.5SO_2$, in which case x may vary between 0.01 and 100 and more preferably, between 0.25 and 5 and more preferably, between 0.5 and 1.25, and most preferably between 0.6 and 1. For example the cell may be assembled with a concentrated $NaAlCl_4.1.5SO_2$ electrolyte to have a higher boiling point electrolyte during the assembly, which is then diluted back to the optimal nearly $NaAlCl_4.2SO_2$ concentration by the end of the first charging cycle through the use of $Na_2S_2O_4$ excess in the cathode material.

The obtained cathode material supports highly reversible battery cell operation, and provides approximately 2.8 V average cell voltage during the discharge process. In contrast to NaCl, the $Na_2S_2O_4$:$NaAlCl_4$ mixture forms a thick layer over the carbon surface, thereby causing a thickness-dependent voltage plateau for the recharging phase. When employing Ketjen-Black material as carbon framework (1400 $m^2$/g surface area), the maximum mass of rechargeable $Na_2S_2O_4$:$NaAlCl_4$ mixture corresponds to approximately 10.5 g of $Na_2S_2O_4$:$NaAlCl_4$ mixture per 1 g carbon, yielding to 1500 mAh/g recharging capacity with respect to the carbon mass. Deposition of lower mass amount of $Na_2S_2O_4$:$NaAlCl_4$ is feasible, but deposition of higher amount of $Na_2S_2O_4$:$NaAlCl_4$ causes the recharging voltage requirement to cross the 4.2 V threshold, and thereby degrades the SEI on the anode side. Without intending to be bound by theory, the oxidation of $Na_2S_2O_4$ into $SO_2$ is thought to occur during the first charging phase. Subsequent discharge-recharge cycling is thought to be analogous to the cell reaction process described in [4], employing $NaAlCl_4.2SO_2$ as a catholyte. While the operating principle of this cell type is similar to the cell operation described in [4], the herein disclosed cell composition and preparation process facilitates the desired discharged state preparation of battery cells employing this cell chemistry.

The theoretical energy density of the abovesaid cell employing $Na_7S_2O_4$:$NaAlCl_4$ cathode material can be calculated according to the following reaction equation:

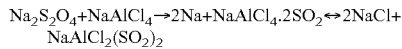

This reaction corresponds to a theoretical capacity of 143 mAh/g with respect to the deposited $Na_2S_2O_4$:$NaAlCl_4$ mass. The corresponding energy density has a dependence on the carbon framework surface area; a larger surface area carbon brings up the average discharge voltage closer to the 3.0 V initial discharge voltage. When employing Ketjen-Black carbon framework (1400 $m^2$/g surface area), the average discharge voltage is 2.8 V. Thereby this cell chemistry corresponds to the theoretical energy density of approximately 400 Wh/kg. An exemplary cell has been constructed by employing ketjen-Black carbon framework over aluminum current collector for the cathode side, copper foil as anode side current collector, and dehydrated $Na_2S_2O_4$:$NaAlCl_4$ mixture. The internal spaces of the carbon framework are almost completely filled up after the deposition of 10.5 g of $Na_2S_2O_4$:$NaAlCl_4$ mixture per 1 g carbon. The cell construction is carried out through the above-described solvent evaporation based deposition and subsequent electrolyte filling. Since the $Na_2S_2O_4$:$NaAlCl_4$ mixture mostly fills up the space in the carbon framework, the exemplary implementation demonstrates that the theoretical capacity can be obtained in an actual cell to a very large extent.

It has been discovered that the abovesaid two cathode compositions may be combined into a hybrid cathode, supporting higher energy density than what is feasible from each variant on its own. The feasibility of this hybrid cathode material is based on the abovesaid ability to recharge $Na_2S_2O_4$:$NaAlCl_4$ mixture at nearly complete electrode space filling; i.e. it may occupy the leftover space besides NaCl, being transformed into $NaAlCl_4.2SO_2$ electrolyte during the recharging process. This high energy density cell composition can be cycled at the same reversibility as the abovesaid individual compositions. The first charging cycle corresponds to the equation: $4NaCl+Na_2S_2O_4+NaAlCl_4 \rightarrow 6Na+NaAlCl_4.2SO_2Cl_2$ Without intending to be bound by theory, the improved energy density may be explained as a consequence of the two-stage complete cell reaction:

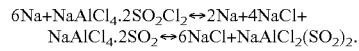

The theoretical energy density of this optimized cell is calculated as follows. The capacity of the first discharge stage, which involves $SO_2Cl_2$ reduction, with respect to all active materials is 170 mAh/g. As discussed above, the average voltage during the first discharge stage is close to 3.2 V. The energy density of the first stage is 545 Wh/kg. The capacity of the second discharge stage, which involves $SO_2$ reduction, with respect to all active materials is 85 mAh/g.

Figure 7:
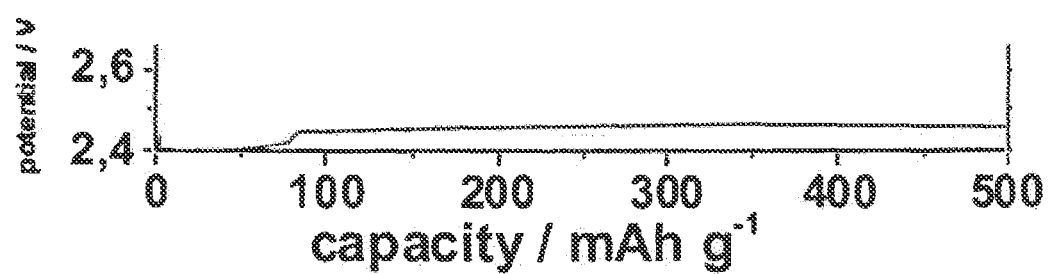
FIG. 7 shows the initial cell voltage evolution during the discharging of the $NaAlCl_4.2SO_2$ catholyte, when the cathode electrode already contains 4.08 mg NaCl within 3.32 mg Ketjen-Black carbon framework. The capacity is indicated with respect to the carbon mass. The experiments were performed in a coin cell, using sodium metal as a counter electrode. The geometric exposed area of the working electrode is 1 $cm^2$.

FIG. 7 shows the discharge voltage evolution in the initial part of the second discharge stage (with respect to carbon mass based capacity). The presence of a large amount of NaCl in the cell shifts the second stage discharge voltage down by about 0.6 V with respect to the theoretical $SO_2$ reduction voltage. Note that, unexpectedly, there is an initial increase in voltage at the beginning of the discharge process, which is probably due to a rearrangement of the electrode solid phases. The average voltage during the second discharge stage is thereby 2.4 V. The voltage during $SO_2$ reduction stays in the fairly constant region since much of the internal space is already occupied by NaCl, which limits the discharge capacity of this second stage to 85 mAh/g, in contrast to the 143 mAh/g capacity of the $SO_2$ catholyte based cell case. As a result, this second discharge stage yields 205 Wh/kg energy density. Therefore the achievable energy density of the discovered hybrid battery composition is 750 Wh/kg. This energy density is approximately 27% higher than what can be obtained from NaCl active cathode material alone. An exemplary method for preparing a cell with this hybrid cathode is analogous to the already described $Na_2S_2O_4$:$NaAlCl_4$ material based cell preparation. The same solvents can be used as described for the $Na_2S_2O_4$:$NaAlCl_4$ mixture deposition, but the employed salt mixture is preferably 4:1:1 molar ratio between NaCl:$Na_2S_2O_4$:$NaAlCl_4$.

Other salt mixtures are possible according to the invention where, in general, the active cathode material comprises $Na_2S_2O_4$ (Sodium-dithionite):x $NaAlO_4$ mixture, or i NaCl j $Na_2S_2O_4$ (Sodium-dithionite) k $NaAlCl_4$ mixture wherein x, i, j and k define molar ratios. Preferably, x is between 0.1 and 10 and more preferably between 0.5 and 2 and most preferably between 0.9 and 1.1. Preferably i is between 1 and 50, j between 0.2 and 5, k between 0.2 and 5 and more preferably i is between 2 and 10, j between 0.5 and 2, k between 0.5 and 2 and most preferably i is between 3.9 and 4.1, j is between 0.9 and 1.1 and k is between 0.9 and 1.1.

While the above disclosed cell formulations have been considering the use of $NaAlCl_4$ electrolyte salt, this salt can be partially replaced by a lighter salt in order to further enhance the cell-level energy density. Especially in case of a cell employing mainly just NaCl active cathode material, the $NaAlCl_4$ salt takes part only in the abovesaid redox shuttle reaction, and may be therefore replaced, to a large extent, by another salt. It is desirable for the replacing salt to be lighter than $NaAlCl_4$, and to support a sufficiently high electrolyte boiling point at the preferred (sodium salt) $2SO_2$ solvent ratio, preferably at least 20° C. It is furthermore required for the additional salt to have a higher oxidation potential than 4 V vs $Na/Na^+$, and to form a liquid electrolyte with $SO_2$ at room temperature. It has been surprisingly discovered that several salts are suitable for the $SO_2$ based liquid electrolyte formulation, and can be mixed with $NaAlCl_4$ containing $SO_2$ based electrolyte in any ratio for the final electrolyte formulation. These newly discovered partially $NaAlCl_4$ replacing salts share the common characteristic of being low melting point salts, preferably with melting points below 500° C., and more preferably having melting points in the 100° C.-300° C. range, and are preferably Sodium containing and more preferably, Sodium and Boron containing and more preferably Sodium, Boron, and Carbon containing and more preferably Sodium, Boron, Carbon and Nitrogen or Sodium, Boron, Carbon and Aluminum containing and most preferably selected from the group of $NaB(CN)_4$, $NaBF_3CN$, $NaBF_2(CN)_2$, $NaBF(CN)_3$, or $NaAl(BH_4)_4$. Other low melting point sodium-containing salts are possible according to the invention.

Alternatively to cell assembly in a fully discharged state, it is also feasible to assemble the cells in partially charged state. One means of carrying out partially charged assembly is to infuse NaCl into the cathode framework, and to deposit Sodium metal onto the anode side. The cell is then filled with $SO_2$ based electrolyte, and sealed. This cell preparation method represents assembly in partially charged state, because upon assembly the cell has active discharged active on the cathode side (NaCl) and charged active material on the anode side (metallic Sodium, which will react with the $SO_2$ based electrolyte). Other means of partially charged assembly is possible.

Considering the 4:1 NaCl $NaAlO_4$.$2SO_2$ cell formulation, the mass of $NaAlCl_4$ salt represents 35% of the total electrolyte+active material mass. With an exemplary 80% $NaAlCl_4$ replacement by, a nearly 20% reduction of the total electrolyte+active material mass can be achieved.

Besides the preferred discharged-state assembly method, an other desired aspect of cost-effective cell assembly according to the invention is a simple electrolyte filling method. A good wettability of the cell structure is a useful asset for cost-effective cell assembly. With sufficient wettability, the electrolyte filling is a simple process because the electrolyte self-infuses into the cell, and comes into complete contact with all active materials. Without good wettability, the cell assembly must employ a more complex filling system, which first creates a vacuum and then forces the electrolyte into the cell structure by applying high pressure. Regarding the anode, the metallic surfaces provide good wettability, which is one of the advantages of working with metallic anode based cell. Regarding the separator, the porous polypropylene type separators, which are presently widely employed for Li-ion cells, have been found to be non-wetting for the $SO_2$ based electrolyte. However, it has been discovered that porous polyethylene type separators provide good wetting for the $SO_2$ based electrolyte. Besides purely polyethylene based separators, well-wetting separators also include polyethylene containing composite separator architectures, such as polypropylene-polyethylene composite separators. Besides its good wetting property, this separator type has also been found to be chemically stable during cell cycling with the respective electrolytes.

Other separator materials are possible according to the invention.

Regarding the wetting of the cathode structure, the $SO_2$ based electrolyte is found to be self-infusing into the cathode electrode when binder materials are employed at such proportion with respect to the carbon mass, which is lower than 10 wt %. While traditional electrode production technology requires about 10% percentage of binder in the electrode, it has been recently disclosed that lower than 10% binder ratio can be employed for example in the case of a dry electrode processing method [9]. An exemplary electrode preparation method entails the use of PTFE or heat-treated PAN binder materials in 6 wt % with respect to the carbon mass, and preparing the cathode electrode through a dry processing method [9]. With these discoveries regarding the anode, separator and cathode wetting, the abovesaid electrolyte can be easily infused into the cell structure during the assembly process.

Preferably the binder wt % is between 1 and 20 and more preferably between 2 and 10 and more preferably between 3 and 8 and most preferably between 4 and 7.

The wetting tests have been carried out on electrodes made of Ketjen-Black carbon, containing 6 wt % PTFE with respect to the carbon mass, with and without 122 wt % of infused NaCl with respect to the carbon mass. The electrodes have been immersed into the electrolyte, and the electrolyte infusion into the electrode structure has been confirmed by weight measurement before and after immersion. The wetting tests of the separators have been carried out analogously.

According to one embodiment of the invention, during the first charging of the NaCl active material containing cell, the generated $SO_2Cl_2$ may cross over onto the anode surface before it is completely covered by a sodium film, thereby causing a continuous shuttle reaction at the anode side, if the charging reaction is performed too slowly. It has been discovered that a cation-conducting film may be beneficially employed between the separator and the anode surface, effectively hindering the cross-over of $SO_2Cl_2$, and thereby giving more flexibility for performing the first charging cycle. Any cation-conducting film is suitable for this purpose, which is stable in the $SO_2$ based electrolyte, and a Nafion film in the micrometer range thickness is found to be particularly suitable. Such film may be deposited over the separator or over the anodic current collector during the cell preparation, or may be even a self-standing film sandwiched between the separator and current collector. Any means of cation-conducting film deposition and any sodium-conducting film material is possible according to the invention, provided that the employed film material is compatible with the SO2 based electrolyte.

With regards to the cathode and anode of the current invention, the cathode and/or anode may be deposited on a conductive current collector/mechanical support. Said current collector/mechanical support may comprise a metal or has a metallic surface. The metallic surface may comprise, for instance, aluminum Al, Cu, Ni, Cr, Pd, Pt, Au, Ag, and/or any other suitable metal. The metallic current collector surface may be deposited on a mechanical support, for instance a non-metallic support. Said metallic current collector surface may be deposited by any means including but not limited to electrochemical deposition, electrospraying, thermal spraying, physical vapor deposition, chemical vapor deposition, atomic layer deposition, or electroless deposition. A carbon comprising material may be applied on the conductive current collector/mechanical support film, according to the invention.

Preferred embodiments of the invention comprise an electrochemical cell for a secondary battery or supercapacitor, wherein the electrolyte comprises a highly concentrated solution of $NaBF_4$ or $NaBH_4$ salt in ammonia, having approximate formulas of $NaBF_4.2.5\ NH_3$ and $NaBH_4.1.5\ NH_3$ respectively. The electrolyte salts' concentration may be varied around these indicated preferred concentration values, e.g. from $NaBF_4.2.3\ NH_3$ to $NaBF_4.2.8\ NH_3$ and from $NaBH_4.1.2\ NH_3$ to $NaBH_4.1.9\ NH_3$ respectively, depending on the desired melting and boiling points. In the electrochemical cell of the preferred embodiments, the anodic current collector substrate is selected from copper or its alloys, allowing for the deposition of metallic active material on the anode. In the electrochemical cell of the preferred embodiments, the active cathode material is selected from carbonyl-type compounds, including Poly-AnthraQuinonyl-Sulphide polymer, AQS-oligomers and indanthrone blue, or similar anthrimidocarbazole compounds, employed for cell assembly either in their original state or in a reduced sodium salt state. In the preferred embodiment of the method of preparing the cell, the metallic sodium film over a copper current collector is obtained through electro-deposition against a metallic sodium counter-electrode in the electrolyte environment. In the preferred embodiment of the method of preparing the cell, the method of controlled reduction of cathodes from charged state to discharged state is through electrochemical reduction with a metallic sodium counter electrode in the electrolyte environment. In the electrochemical cell of the preferred embodiments, the electrolyte comprises $NaAlCl_4.x\ SO_2$, preferably in the $NaAlCl_4.2SO_2$ ratio, $((1-y)\ NaBF_4+y\ NaAlCl_4).x\ SO_2$, or $((1-y)\ NaAl(BH_4)_4+y\ NaAlCl_4).x\ SO_2$ and the anodic current collector substrate is selected from copper or its alloys, allowing for the deposition of metallic active material on the anode. The electrolyte salts' concentration may be varied around the preferred $.2SO_2$ concentration values, depending on the desired melting and boiling points. In the electrochemical cell of the preferred embodiments, the electrolyte has low water contamination in order to facilitate the deposition of metallic active material on the anode. In the electrochemical cell of the preferred embodiments, the active cathode material comprises NaCl. In the electrochemical cell of the preferred embodiments, the active cathode material comprises a $Na_2S_2O_4$ (Sodium-dithionite) $NaAlCl_4$ mixture, preferably in the 1:1 molar ratio, or NaCl $Na_2S_2O_4$ (Sodium-dithionite) $NaAlCl_4$ mixture, preferably in the 4:1:1 molar ratio. In the electrochemical cell of the preferred embodiments, the separator contains a hydrophilic surface, such as a hydrophilic type porous polypropylene separator, in order to support the good wetting of the electrolyte. In the electrochemical cell of the preferred embodiments, the separator comprises porous polyethylene or contains porous polyethylene in its structure, in order to support the good wetting of the electrolyte. In the electrochemical cell of the preferred embodiments, the cathode has not more than 10 weight % binder ratio, preferably 5-6%, in order to support electrolyte self-infusion into the electrode. In the electrochemical cell of the preferred embodiments, the cell is prepared in the discharged state, employing only the anodic current collector as negative electrode for the assembled cell.

A new polymer type high-energy cathode material has been furthermore discovered, which complements well the above disclosed electrolyte formulations. This cathode material is a co-polymer of triazine rings and quinone rings. Its structure is shown in FIG. 7. This material may be described by the $[C_8H_2N_2O_2Na_2]$, formula, and self-arranges during its synthesis into a micro-porous structure, where well-defined 1-2 nm wide channels facilitate the ion migration. This material can be reversibly cycled down to the 13 V vs $Na/Na^+$ low voltage limit. Both the triazine and quinone rings contribute to its cycling capacity, resulting in a very high specific capacity, measured to be in excess of 300 mAh/g.

An exemplary procedure for the abovesaid Triazine-Quinone co-polymer synthesis may be based on the 2,5-dichloro-1,4-hydroquinone starting material. This precursor is firstly stirred in aqueous or alcohol-based NaOH solution for achieving $H^+$ to $Na^+$ ion exchange. After subsequent evaporation of the solvent, it is stirred in hot DMSO based solution of NaCN for achieving Chloride to Cyanide ligand exchange. A suitable temperature range for this reaction is between 100 and 150° C. Subsequently, it is mixed with NaOH—NaCl salt eutectic, and subjected to ionothermal heat treatment in the 300 to 400° C. temperature range. The micro-porous polymer structure is self-assembled during this heat treatment. The final polymer is then obtained after washing away the salts and filtration.

One embodiment of the invention comprises an electrochemical cell, wherein the active cathode material material comprises Triazine-Quinone co-polymer.

EXAMPLES

Preparation of Electrolytes

Example 1

The liquid ammoniate $NaI.3.3NH_3$ was synthesized according to [1].

Example 2

The liquid ammoniate $NaBF_4.2.5NH_3$ was synthesized by condensing an excess of ammonia on 23 g of $NaBF_4$ at −50° C. The reaction was carried out under magnetic stirring to obtain a colorless solution. Once prepared the solution was purified using an excess of metallic sodium: the solution turned blue due to the generation of solvated electrons, which remove impurities such as oxygen and water. Finally, the solution approached room temperature and the excess of ammonia was evaporated to form the final ammoniate. The composition is easy to follow by successive weighing.

Example 3

The liquid ammoniate $NaBH_4.1.5NH_3$ was synthesized following the general procedure of Example 2. The initial amount of $NaBH_4$ was 13 g.

Example 4

The $NaAlO_4$ 2 $SO_2$ electrolyte was synthesized according to [4].

Its boiling point of approximately 20° C. has been observed. $NaAlCl_4$: 1.5 $SO_2$ electrolyte was synthesized according to same initial procedure, and was subsequently warmed up to let $SO_2$ evaporate till reaching $NaAlCl_4$.1.5 $SO_2$ concentration. An approximately 40° C. boiling point has been observed for $NaAlCl_4$: 1.5 $SO_2$.

Preparation of the Active Material

Example 5

The PAQS active material has been prepared according to [2]. Anhydrous $Na_2S$ was obtained by removing the hydration water from $Na_2S.9H_2O$ through drying in several steps: first, the $Na_2S.9H_2O$ was heated at 50° C. for 240 minutes, then the temperature was increased to 80° C. for 240 minutes. In the third step, the temperature was 120° C. during 2 hours. Finally, the temperature was increased to 160° C. by 2 hours to obtain dry $Na_2S$.

Example 6

The active material for the indanthrone blue based electrode was prepared by a solvothermal method. The indanthrone blue and carbon nanotubes, as conducting carbon additive, were dispersed in N-methylpyrrolidine in the ratio 7/5 under magnetic stirring at room temperature to form a slurry. Then the mixture is heated in an autoclave at 180° C. overnight. The product was filtered and washed with deionized water several times. Finally, it was dried in a vacuum oven at 150° C. for 3 hours and then at 80° C. for 8 hours.

Preparation of the Positive Electrode

Example 7

60 wt % of PAQS from Example 5, 30 wt % carbon nanotubes and 10 wt % PTFE (polytetrafluoroethylene) as a binder were mixed in a ball mill during 2 hours at 350 rpm. Then, the homogeneous mixture was pressed onto carbon-coated aluminum foil using a hydraulic press at 1.5 tons for 2 min. The final electrode was dried at 60° C. in a vacuum oven overnight. The average electrode material quantity is 8 mg of covering 1.1 $cm^2$ substrate area.

Example 8

90 wt % of the active material from Example 6 was dispersed with 10 wt % of PVDF (polyvinilidenefluoride) in N-methylpyrrolidine under magnetic stirring at room temperature to form a slurry. Then the slurry was coated onto carbon-coated aluminum foil. Finally, the electrode was dried at 80° C. overnight. The average material is 3.5 mg of mixture in 1.1 $cm^2$.

Example 9

90 wt % of mixture of indanthrone blue and carbon nanotubes from Example 6 and 10 wt % of PTFE were mixed in a ball mill at 350 rpm during 2 hours. The mixture of the homogeneous powder was pressed on carbon-coated aluminum using a hydraulic press at 1.5 tons for 2 min. Finally, the electrode was dried in a vacuum oven at 130° C. for 5 hours.

Example 10

The electrode framework was prepared from a mixture of 94 wt % Ketjen-Black carbon and 6 wt % of PTFE. This mixture was dry-pressed onto carbon-coated aluminum current collector, according to the dry-pressing procedure of [9]. NaCl was dissolved in anhydrous methanol, and the solution was drop-cast onto the electrode in sufficient amount to obtain approximately 2.5:1 mass ratio between the NaCl and carbon. Finally, the electrode was dried at 80° C. overnight in vacuum.

Preparation of the Negative Electrode for Charged State Assembly

Example 11

The sodium electrode was prepared by electrodeposition at constant potential (−0.1V vs $Na^+$/Na) on a copper substrate in the abovesaid ammoniates.

Preparation of the Rechargeable Batteries

Example 12

A rechargeable sodium battery was prepared having a sodium anode, a glass microfiber separator of 420 micron of thickness, which is soaked in $NaI.3.3NH_3$ electrolyte and, the PAQS based cathode from Example 7. The battery prepared for this example exhibited a maximum cathode capacity of 150 $mA·h·g^{-1}{}_{PAQS}$. The cell was subjected to a 7 minute quick discharge/charge cycle using the limits from 2.6 V to 1.2 V vs. $Na^+$/Na. The average utilization of active material capacity during the first 50 cycles was 64%.

Example 13

A rechargeable sodium battery was prepared having a sodium anode, a glass microfiber separator of 420 micron of thickness which is soaked in $NaI.3.3$ $NH_3$ electrolyte and, the indanthrone blue based cathode from Example 8. The battery prepared for this example exhibited about 600 cycles with a maximum cathode capacity of 150 $mA·h·g^{-1}{}_{IB}$. The cell was subjected to a 5 minute quick discharge/charge cycle using the limits from 2.5 V to 1.3 V vs. $Na^+$/Na. The average utilization of active material capacity was 62%.

Example 14

A rechargeable sodium battery was prepared having a sodium anode, a glass microfiber separator of 420 micron of thickness which is soaked in $NaBF_4.1.5NH_3$ electrolyte and, the indanthrone blue based cathode from Example 8. The battery prepared for this example exhibited about 100 cycles with a maximum cathode capacity of 200 $mA·h·g^{-1}{}_{IB}$. The cell was subjected to a 5 minute quick discharge/charge cycle using the limits from 3 V to 1.4 V vs. $Na^+$/Na. The average utilization of active material capacity during discharge/charge process was 77%.

Example 15

Figure 8:
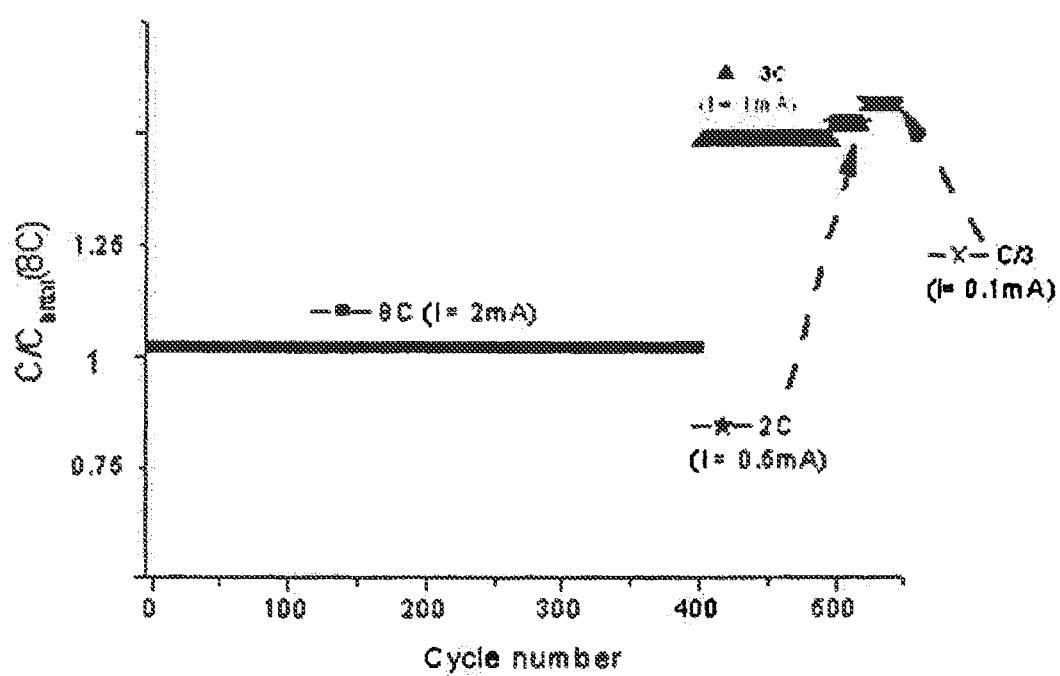
FIG. 8 shows the ratio between the capacity and the initial capacity vs. the cycle number for an IB-based electrode in $NaI.3.3NH_3$. The experiment was performed in a two-electrode cell at different C rates using sodium metal as a negative electrode. The active mass is 3.5 mg of indanthrone blue, with a geometric exposed area of 1.1 $cm^2$.

A rechargeable sodium battery was prepared having a sodium anode, a glass microfiber separator of 420 micron of thickness which is soaked in NaI.3.3NH$_3$ electrolyte and, the indanthrone blue based cathode from Example 9. The battery prepared for this example exhibited about 550 cycles and the capacity loss was not significant. The cell was subjected at different C rates using the limits from 2.5 V to 1.4 V vs. Na$^+$/Na (FIG. 8).

Example 16

A rechargeable sodium battery was prepared having a copper foil negative electrode, a porous polyethylene separator of 15 micron of thickness and the NaCl based positive electrode from Example 10. Both the separator and the positive electrode were soaked in NaAlCl$_4$.2SO$_2$ electrolyte. The battery prepared for this example exhibited a capacity of 435 mAh/g respect to the NaCl mass.

Example 17

An electrolyte was prepared from 4 molar NaBF$_4$ dissolved in Ethylenediamine. A rechargeable sodium battery was prepared having a sodium anode, a glass microfiber separator of 420 micron of thickness which is soaked in this electrolyte and, the indanthrone blue based cathode from Example 8. The battery prepared for this example exhibited about 100 cycles with a maximum cathode capacity of 200 mA·h·g$^{-1}$$_{IB}$. The cell capacity remained stable during the cycling, and a post-mortem examination revealed a shiny sodium surface, without any signs of significant electrolyte reaction or cathode material cross-over.

Example 18

A rechargeable battery was prepared through the same procedure as in example 16, but using sodiated Nafion coated polyethylene separator instead of a plain polyethylene separator. The micrometer-thick Nafion coating has been deposited over the separator according to the procedure described in [10]. The cell exhibited the same capacity and cycling stability as the cell in example 16.

REFERENCES

1. Gonçalves et al. Portugaliae Electrochimica Acta (2006); 24: 117-127.
2. Deng et al. Nature Scientific Reports (2013); 3: 2671.
3. Kirk-Othmer Encyclopedia of Chemical Technology.
4. G. Jeong et al. Nature Scientific Reports (2015); 5:12827,
5. Patent number US 2014/0220428 A1
6. Patent number EP 2860799 A1
7. R McKee et al. Industrial and Engineering Chemistry (1924); 16:4
8. S Hossain et al. LABCOM Contract DAAL01-89-C-0939; 2nd Quarterly Report
9. Patent number DE 10 2012 203 019 A1
10. Bauer et al. Chem. Commun, (2014); 50:3208-3210.

The invention claimed is:

1. An electrochemical cell comprising:
   a) an electrolyte comprising a sulfur-dioxide (SO2)-, amine- and/or ammonia (NH$_3$)-based solvent and a sodium-containing salt, an anode comprising, at least, a conductive anodic current collector, and a cathode comprising a cathode material;
   b) the cathode material comprising a sodium-containing material and a carbon-containing material, wherein the anode consists essentially of only a current collector and sodium metal and, wherein the anode comprises less than 50 wt % sodium in the cell discharge state;
   c) the electrolyte positioned between the cathode and the anodic current collector; and
   d) an electro-deposited layer of metallic sodium active material on the anodic current collector in the charge state.

2. The cell of claim 1, wherein at least one sodium-containing material is inorganic.

3. The cell of claim 1, wherein the solvent of the electrolyte comprises sulfur dioxide (SO$_2$).

4. The cell of claim 1, wherein the solvent of the electrolyte comprises ammonia (NH$_3$), or an organic amine or a mixture comprising one of or more of said solvents.

5. The cell of claim 4, wherein the organic amine is selected from ethylene-diamine, 1,3-diaminopropane, diethylenetriamine, n-butylamine, isopropylamine, ethyl-amine, or methyl-amine, including any mixture comprising one or more of said organic amines.

6. The cell of claim 1, wherein the electrolyte salt comprises a low melting point salt.

7. The cell of claim 6, wherein the low melting point salt has a melting temperature between 100 degrees Celsius and 300 degrees Celsius.

8. The cell of claim 1, wherein the salt comprises sodium.

9. The cell of claim 8, wherein the salt also comprises boron.

10. The cell of claim 8, wherein the salt also comprises carbon.

11. The cell of claim 8, wherein the salt also comprises nitrogen or aluminum.

12. The cell of claim 8, wherein the salt comprising sodium is at least one of NaAlCl$_4$, NaBF$_4$, NaBH$_4$, NaB(CN)$_4$, NaBF$_3$CN, NaBF$_2$(CN)$_2$, NaBF(CN)$_3$, or NaAl(BH$_4$)$_4$.

13. The cell of claim 3, wherein the molar ratio x of (salt):x SO$_2$ is between 1 and 4.

14. The cell of claim 1, wherein the sodium-containing cathode material comprises Na$_2$S$_2$O$_4$ (Sodium-dithionite):x NaAlCl$_4$ mixture or i NaCl:j Na$_2$S$_2$O$_4$ (Sodiumdithionite):k NaAlCl$_4$ mixture wherein x, i, j and k define molar ratios, wherein x is between 0.01 and 100, i is between 1 and 50, j is between 0.2 and 5, and k is between 0.2 and 5.

15. The cell of claim 14, wherein the sodium-containing cathode material comprises Na$_2$S$_2$O$_4$ (Sodium-dithionite):x NaAlCl$_4$ mixture, wherein molar ratio x is between 0.5 and 2.

16. The cell of claim 1, wherein the sodium-containing cathode material comprises NaCl.

17. The cell of claim 1, wherein the cell is assembled in a fully discharged state.

18. The cell of claim 16, wherein the sodium-containing cathode material comprises i NaCl:j Na$_2$S$_2$O$_4$ (Sodium-dithionite):k NaAlCl$_4$ mixture, wherein i is between 3 and 5, j is between 0.5 and 2 and k is between 0.5 and 2.

19. The cell of claim 1, comprising a separator having a surface energy higher than the electrolyte.

20. The cell of claim 1, comprising a separator which comprises spandex, polypropylene or polyethylene.

21. The cell of claim 1, wherein the sodium salt comprises at least one of boron, aluminum, fluoride, chloride or hydrogen.

22. The cell of claim 1, wherein the cathode material comprises a carbonyl-based or an anthrimidocarbazole based compound.

23. The cell of claim 22 wherein the carbonyl or anthrimidocarbazole based compound comprises Poly-AnthraQuinonyl-Sulphide polymer, AQS-oligomers or indanthrone blue.

24. The cell of claim 1, wherein the carbon containing material is at least one of carbon nanotube (CNT), fullerene, carbon nanobud (CNB), graphene, graphite, Ketjen-Black, mesoporous carbon, activated carbon, carbon nanohorns, carbon nanofoam, Q-carbon, T-carbon, Y-carbon, nanocarbon, carbon nanoparticle or porous carbon.

25. The cell of claim 1, wherein the cathode comprises a binder material.

26. The cell of claim 25, wherein the binder material is polytetrafluoroethylene (PTFE), polyvinylidene fluoride or polyvinylidene difluouride (PVDF), Styrene-butadiene-rubber (SBR), or heat treated Polyacrylonitrile.

27. The cell of claim 1, wherein the cathode is deposited on at least one of a conductive current collector or a mechanical support.

28. The cell of claim 27, wherein the at least one of a conductive current collector or a mechanical support comprises a metal or has a metallic surface.

29. The cell of claim 28, wherein the at least one of a conductive current collector or a mechanical support comprises aluminum Al, Cu, Ni, Cr, Pd, Pt, Au and/or Ag or an alloy comprising Al, Cu, Ni, Cr, Pd, Pt, Au and/or Ag.

30. The cell of claim 28, wherein the cathode is deposited on a metallic conductive current collector, the metallic conductive current collector deposited on a mechanical support.

31. The cell of claim 22, wherein the carbon comprising material is applied on at least one of the conductive current collector or the mechanical support.

32. The cell of claim 1, wherein the cathode contains less than 10 weight % binder.

33. The cell of claim 32, wherein the cathode contains 4-7 weight % binder.

34. The cell of claim 1, wherein metallic sodium active material is electrodeposited on the anode or the anodic current collector substrate during charging of the electrochemical cell.

35. The cell of claim 34, wherein the deposited metallic sodium active material has at least one of: (i) a surface roughness of below 100 microns or (ii) less than 90% of the total mass of the sodium deposit as dendrites.

36. A battery or supercapacitor comprising an electrochemical cell of claim 1.

37. An electric vehicle, an electrical or electronic device, a power unit, a backup energy unity or a grid storage or stabilization unit comprising an electrochemical cell according to claim 1.

* * * * *